United States Patent
Shilo et al.

(10) Patent No.: US 11,949,542 B2
(45) Date of Patent: Apr. 2, 2024

(54) METHOD AND APPARATUS FOR REDUCING PEAK TO AVERAGE POWER RATIO

(71) Applicant: HUAWEI TECHNOLOGIES CO., LTD., Shenzhen (CN)

(72) Inventors: Shimon Shilo, Hod Hasharon (IL); Oded Redlich, Hod Hasharon (IL); Ezer Melzer, Hod Hasharon (IL); Doron Ezri, Hod Hasharon (IL); Yoav Levinbook, Hod Hasharon (IL); Genadiy Tsodik, Hod Hasharon (IL); Jian Yu, Shenzhen (CN); Mengshi Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/345,807

(22) Filed: Jun. 30, 2023

(65) Prior Publication Data
US 2023/0344694 A1    Oct. 26, 2023

Related U.S. Application Data

(63) Continuation of application No. PCT/CN2020/141894, filed on Dec. 31, 2020.

(51) Int. Cl.
*H04L 27/26*    (2006.01)
*H04L 5/00*    (2006.01)
*H04W 74/0816*    (2024.01)

(52) U.S. Cl.
CPC ........ *H04L 27/2614* (2013.01); *H04L 5/0053* (2013.01); *H04W 74/0816* (2013.01)

(58) Field of Classification Search
CPC ..... H04L 27/2614; H04L 5/053; H04L 69/08; H04L 69/085
See application file for complete search history.

(56) References Cited

U.S. PATENT DOCUMENTS

2017/0188376 A1    6/2017    Noh et al.
2022/0353049 A1*  11/2022    Yang .................... H04L 5/0039

OTHER PUBLICATIONS

Shellhammer (Qualcomm) et al., "Enhanced Trigger Frame for EHT Support," IEEE 802.11-20/1429r1, vol. 802.11 EHT, 802.11be, No. 1, XP068173188, Total 20 pages (Sep. 2020).
Vermani (Qualcomm) et al., "Proposed Draft Text (PDT PHY): An Update to Preamble: U-Sig" IEEE 802.11-20/1875r2, IEEE 802.11, Wireless LANs, vol. 802.11 EHT, 802.11be, No. 2, IEEE-SA Mentor, Piscataway, NJ USA, XP068175271, Total 13 pages (Nov. 2020).

* cited by examiner

*Primary Examiner* — James P Duffy
(74) *Attorney, Agent, or Firm* — Leydig, Voit & Mayer, Ltd.

(57) ABSTRACT

This application relates to the field of communications technologies, in particularly related to wireless fidelity (WIFI) technologies, and provides a method and apparatus for reducing peak to average power ratio (PAPR) for transmitting a physical layer protocol data units (PPDUs). The method can be used for both an access point (AP) and a station (STA). The method comprises: operating on a first disregard bits sequence to obtain a second disregard bits sequence, wherein the first disregard bits sequence is with all bits set to '1', and transmitting the PPDU, wherein the PPDU comprises the second disregard bits sequence.

16 Claims, 34 Drawing Sheets

METHOD AND APPARATUS FOR REDUCING PEAK TO AVERAGE POWER RATIO

CROSS-REFERENCE TO RELATED APPLICATIONS

This application is a continuation of International Application No. PCT/CN2020/141894, filed on Dec. 31, 2020, the disclosure of which is hereby incorporated by reference in its entirety.

TECHNICAL FIELD

The present disclosure relates to wireless communication systems and, more specifically, but not exclusively, to a system and method for reducing peak to average power ratio (PAPR) in a special field of a physical layer protocol data units (PPDUs).

BACKGROUND

A universal signal (U-SIG) field is used in 802.11be to convey information to all receivers about various important parameters such as a standard version (802.11be or later version), a bandwidth, number of extremely high throughput, EHT, signal (EHT-SIG) symbols, etc. The receivers include both access point (AP) and/or stations (STAs). The U-SIG is composed of 2 OFDM symbols, and each OFDM symbol contains 26 information bits.

Since 802.11be is divided into two releases—Release 1 and Release 2, and Release 2 is in the progress of study, some bits within the U-SIG field are reserved. There is an agreement to divide these reserved bits into two types:

Validate bits—used by the receiver to determine whether to continue receiving the packet or end the reception. For example, a Release 1 receiver may understand that the packet is intended for a Release 2 receiver so it can end the reception.

Disregard bits—bits that are defined as "don't care"

Both validate and disregard bits may be used for other purposes within Release 2.

At this stage in time, the disregard bits are all set to a value of '1' in a multi-user (MU) PPDU type (or 31 in decimal format). The disregard bits are copied from the trigger-based (TB) frame in a TB PPDU (validate bits are also set to '1').

The newly introduced disregard bits may cause some problems of performance for both MU PPDU and TB PPDU.

SUMMARY

It is an object of the present disclosure to provide a method and apparatus for reducing PAPR for transmitting a PPDU, thereby improving the transmitting performance of the PPDU.

The foregoing and other objects are achieved by the features of the independent claims. Further implementation forms are apparent from the dependent claims, the description and the figures.

According to a first aspect of the present disclosure, a communication device is disclosed. The communication device may be an AP or STA. The communication device is used to transmit a PPDU to one or more receiving devices and the PPDU comprises a universal signal, U-SIG, field, the communication device comprising a processor, configured to: operate on a first disregard bits sequence to obtain a second disregard bits sequence, wherein the first disregard bits sequence is with all bits set to '1'; and a transmitter, configured to: transmit the PPDU, wherein the PPDU comprises the second disregard bits sequence.

In a further implementation of the first aspect, the U-SIG comprises at least a first U-SIG symbol and a second U-SIG symbol.

In a further implementation of the first aspect, operation on a first disregard bits sequence to obtain a second disregard bits sequence comprises: set the value of the first disregard bits sequence to a sequence comprising at least one '0' bit; or change the value of the validate bit immediately after the first disregard bits sequence to '0' and modifying the value of the first disregard bits sequence to a pre-set value; or change the location of the first disregard bits sequence among U-SIG fields and change the value of the first disregard bits; or replace a portion of the first disregard bits sequence with a cyclic redundancy check, CRC.

In a further implementation of the first aspect, setting the value of the first disregard bits sequence to a sequence comprising at least one '0' bit comprises: set the first disregard bits sequence of MU PPDU to one of the sequence in the set {'00101', '00110', '01001', '01111', '10011', '10101', '11000', '10110' }; or set the first disregard bits sequence of TB PPDU for the first U-SIG symbol to one of the sequence in the set {'010010', '010011', '010100', '010101', '011100', '011101', '011110', '011111', '100101', '100010', '110100', '111000', '111001'}; or set the first disregard bits sequence of TB PPDU for the second U-SIG symbol to one of the sequence in the set {'01001', '01101', '01111', '11010', '11011', '11101', '11110', '11111'}; or set a single global value of the first disregard bits sequence within the first U-SIG symbol for different BW values for a TB PPDU, and the first disregard bits sequence is in particularly set as '011110' in binary; or set a single global value of the first disregard bits in the second U-SIG symbol for different bandwidth values for a TB PPDU, and the first disregard bits sequence is in particularly set as '01001' or '11110' in binary.

In a further implementation of the first aspect, setting the value of the first disregard bits sequence to a sequence in the set of {'00101', '00110', '01001', '01111', '10011', '10101', '11000', '10110'} comprises: the first disregard bits sequence is set to '00101' when the PPDU is transmitted over 20 MHz bandwidth; or the first disregard bits sequence is set to one of {'00101', '00110', '01001', '01111', '10011'} when the PPDU is transmitted over 40 MHz bandwidth; or the first disregard bits sequence is set to one of {'00101', '01111', '10011', '11000'} when the PPDU is transmitted over 80 MHz bandwidth; or the first disregard bits sequence is set to one of {'00101', '10101'} when the PPDU is transmitted over 160 MHz bandwidth; or the first disregard bits sequence is set to one of {'00101', '10110'} when the PPDU is transmitted over 320 MHz bandwidth; or the first disregard bits sequence is set to '00101' for any bandwidth.

In a further implementation of the first aspect, changing the value of the validate bit immediately after the first disregard bits sequence to '0' and modifying the value of the first disregard bits sequence to a pre-set value comprises: the pre-set value is set to '01001' for 20 MHz bandwidth.

In a further implementation of the first aspect, changing the location of the first disregard bits sequence among U-SIG fields and changing the value of the first disregard comprises: move the first disregard bits sequence after a basic service set, BSS, color field and before a TXOP field; or moving the first disregard bits sequence immediately before the BSS color field.

In a further implementation of the first aspect, replacing a portion of the first disregard bits sequence with a cyclic redundant check, CRC, comprises: take one bit of the first disregard bits sequence as CRC indicator, wherein the CRC indicator indicates four CRC bits are comprised in the first disregard bits sequence.

In a further implementation of the first aspect, the four CRC bits are the LSBs of an 8-bit CRC, wherein the 8-bit CRC is computed over information bits transmitted over the first U-SIG symbol and the second U-SIG symbol.

In a further implementation of the first aspect, the 8-bit CRC is divided into LSBs and MSBs, wherein the MSBs are transmitted over the second U-SIG symbol.

In a further implementation of the first aspect, the indicator is set to '1' or '0'.

In a further implementation of the first aspect, the PPDU comprises: multi-user, MU, PPDU, or trigger-based, TB, PPDU.

According to a second aspect of the present disclosure, a method of reducing peak to average power ratio, PAPR, for transmitting a physical layer protocol data unit, PPDU, comprising: operating on a first disregard bits sequence to obtain a second disregard bits sequence, wherein the first disregard bits sequence is with all bits set to 1'; and transmitting the PPDU, wherein the PPDU comprises the second disregard bits sequence.

In a further implementation of the second aspect, the U-SIG comprises at least a first U-SIG symbol and a second U-SIG symbol.

In a further implementation of the second aspect, operating on a first disregard bits sequence to obtain a second disregard bits sequence comprises: set the value of the first disregard bits sequence to a sequence comprising at least one '0' bit; or change the value of the validate bit immediately after the first disregard bits sequence to '0' and modifying the value of the first disregard bits sequence to a pre-set value; or change the location of the first disregard bits sequence among U-SIG fields and change the value of the first disregard bits; or replace a portion of the first disregard bits sequence with a cyclic redundancy check, CRC.

In a further implementation of the second aspect, setting the value of the first disregard bits sequence to a sequence comprising at least one '0' bit comprises: set the first disregard bits sequence of MU PPDU to one of the sequence in the set {'00101', '00110', '01001', '01111', '10011', '10101', '11000', '10110'}; or set the first disregard bits sequence of TB PPDU for the first U-SIG symbol to one of the sequence in the set {'010010', '010011', '010100', '010101', '011100', '011101', '011110', '011111', '100101', '100010', '110100', '111000', '111001'}; or set the first disregard bits sequence of TB PPDU for the second U-SIG symbol to one of the sequence in the set {'01001', '01101', '01111', '11010', '11011', '11101', '11110', '11111'}; or set a single global value of the first disregard bits sequence within the first U-SIG symbol for different BW values for a TB PPDU, and the first disregard bits sequence is in particularly set as '011110' in binary; or set a single global value of the first disregard bits in the second U-SIG symbol for different bandwidth values for a TB PPDU, and the first disregard bits sequence is in particularly set as '01001' or '11110' in binary.

In a further implementation of the second aspect, setting the value of the first disregard bits sequence to a sequence in the set of {'00101', '00110', '01001', '01111', '10011', '10101', '11000', '10110'} comprises: the first disregard bits sequence is set to '00101' when the PPDU is transmitted over 20 MHz bandwidth; or the first disregard bits sequence is set to one of {'00101', '00110', '01001', '01111', '10011'} when the PPDU is transmitted over 40 MHz bandwidth; or the first disregard bits sequence is set to one of {'00101', '01111', '10011', '11000'} when the PPDU is transmitted over 80 MHz bandwidth; or the first disregard bits sequence is set to one of {'00101', '10101'} when the PPDU is transmitted over 160 MHz bandwidth; or the first disregard bits sequence is set to one of {'00101', '10110'} when the PPDU is transmitted over 320 MHz bandwidth; or the first disregard bits sequence is set to '00101' for any bandwidth.

In a further implementation of the second aspect, changing the value of the validate bit immediately after the first disregard bits sequence to '0' and modifying the value of the first disregard bits sequence to a pre-set value comprises: the pre-set value is set to '01001' for bandwidth.

In a further implementation of the second aspect, changing the location of the first disregard bits sequence among U-SIG fields and changing the value of the first disregard comprises: move the first disregard bits sequence after a basic service set, BSS, color field and before a TXOP field; or moving the first disregard bits sequence immediately before the BSS color field.

In a further implementation of the second aspect, replacing a portion of the first disregard bits sequence with a cyclic redundant check, CRC, comprises: take one bit of the first disregard bits sequence as CRC indicator, wherein the CRC indicator indicates four CRC bits are comprised in the first disregard bits sequence.

In a further implementation of the second aspect, the four CRC bits are the LSBs of a 8-bit CRC, wherein the 8-bit CRC is computed over information bits transmitted over the first U-SIG symbol and the second U-SIG symbol.

In a further implementation of the second aspect, the 8-bit CRC is divided into LSBs and MSBs, wherein the MSBs are transmitted over the second U-SIG symbol.

In a further implementation of the second aspect, the indicator is set to '1' or '0'.

In a further implementation of the second aspect, the PPDU comprises: multi-user, MU, PPDU, or trigger-based, TB, PPDU.

According to a third aspect of the present disclosure, a computer readable storage medium is provided. The computer readable storage medium stores an instruction, and when the instruction runs on a computer, the computer is enabled to perform the method of reducing PAPR according to any one of the second aspect or the possible implementations of the second aspect.

According to a fourth aspect of the present disclosure, a computer program product including an instruction is provided. When the computer program product runs on a computer, the computer is enabled to perform the method of reducing PAPR according to any one of the second aspect or the possible implementations of the second aspect.

According to a fifth aspect of the present disclosure, a communications system is provided. The communications system includes a plurality of communication devices, and the plurality of communication devices include AP and STA, where the communication device is configured to support the method of reducing PAPR according to any one of the second aspect or the possible implementations of the second aspect.

According to a sixth aspect of the present disclosure, computer storage medium, or computer program product of any one of the methods of reducing PAPR is configured to perform the corresponding method provided above, and therefore, for beneficial effects that the apparatus, the computer storage medium, or the computer program product can achieve, reference may be made to beneficial effects of the corresponding method provided above. Details are not described herein again.

Other apparatus, methods, features, and advantages of the present disclosure will be or become apparent to one with skill in the art upon examination of the following drawings and detailed description. It is intended that all such additional apparatus, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
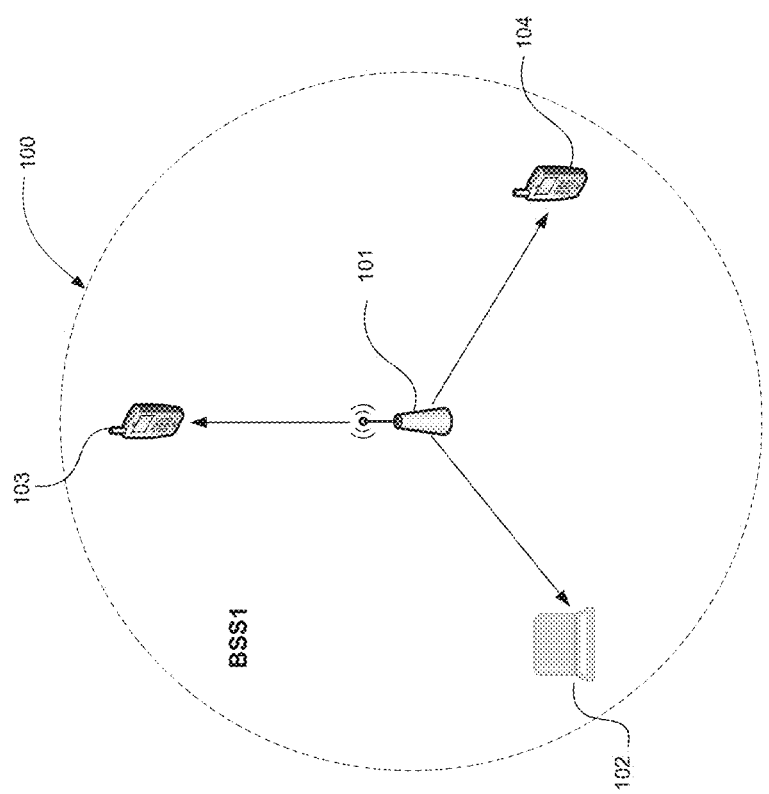
FIG. 1 shows a system for reducing PAPR in a field of PPDUs according to some embodiments of the present disclosure.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

FIG. 1 shows a system for reducing PAPR in a field of PPDUs according to some embodiments of the present disclosure. System 100, includes an access point (AP) 101 and one or more stations (STAs), for example STA 102, STA 103 and STA 104 shown in FIG. 1. The system 100 is also called basic service set (BSS) in the present disclosure. The AP 101 and/or STAs in the system 100 are both called communication device. In some embodiments, the communication device may act as AP, while the communication device may act as STA in some other embodiments. In system 100, The AP and the STAs communicate in both downlink and uplink. The arrows between AP and STAs shown in FIG. 1 only show downlink, but it should not be understood as a limitation of transmission.

Although the system 100 shows only one AP in the system, the system may include more than one APs in the system and the APs in the system may perform coordination transmission.

The system 100 in the present disclosure includes but is not limited to: a wireless fidelity (WIFI) communication system, a narrowband internet of things (NB-IoT) system, a long term evolution (LTE) system, a $5^{th}$ generation mobile communications system (5G) or beyond, a machine to machine (M2M) communications system, or the like. The LTE system and 5G or beyond may integrate a WIFI system.

In the present disclosure, the communicate device may be AP 101 or STAs, and a STA may be for example, a mobile phone, an intelligent terminal, a tablet computer (tablet), a notebook computer (laptop), a video game console, a multimedia player, vehicle which supports WIFI, device to device (D2D) equipment, or any smart devices. The AP and/or STA may be stationary or mobile devices.

The WIFI system may support all the institute of electrical and electronic engineers (IEEE) 802.11 serials including but not limited to: 802.11a/b/g, 802.11n, 802.11ac, 802.11be, 802.11ax or beyond.

Figure 2:
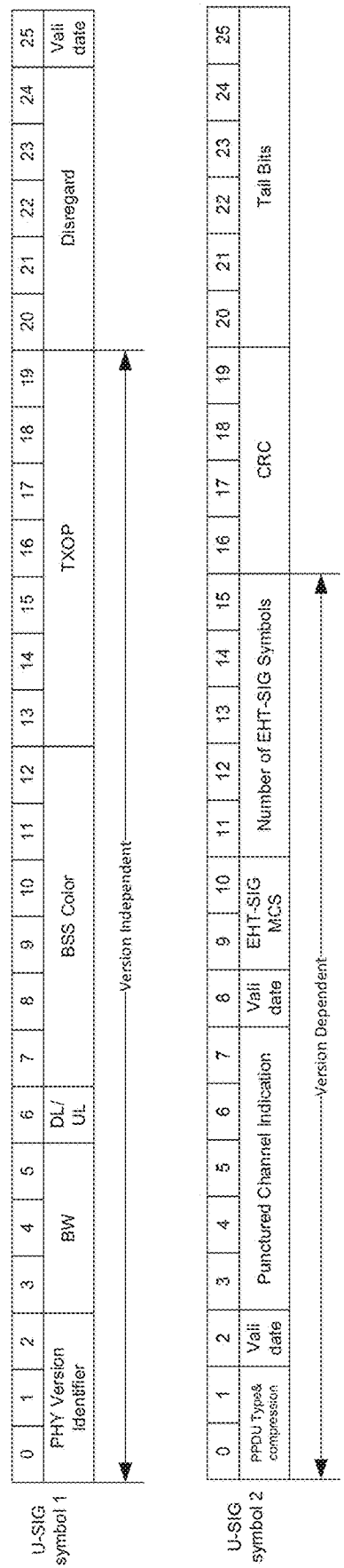
FIG. 2 shows a U-SIG design for an MU PPDU in 802.11be Release 1.

FIG. 2 shows a U-SIG design for an MU PPDU in 802.11be Release 1. The bits contained in a U-SIG's first symbol of MU PPDU convey information about the physical layer (PHY) version (e.g. 802.11be or a later version of the standard), the bandwidth (BW) (e.g. 40 MHz etc.), whether it is a downlink (DL) or uplink (UL) transmission, the BSS Color which is used to differentiate between possibly different neighboring BSS values, transmit opportunity (TXOP) which may include duration of the TXOP and/or how long the transmitter is taking advantage of the channel resources.

The bits contained in the U-SIG's second symbol, for an MU PPDU, convey information about the PPDU type (e.g. MU PPDU, TB PPDU) and compression (e.g. non-OFDMA PPDU with reduced signaling), channel puncturing, the modulation and coding scheme (MCS) which is used for the EHT-SIG field and number of OFDM symbols used for the EHT-SIG field, CRC and 6 zero tail bits which is used for a convolutional code.

Figure 3:
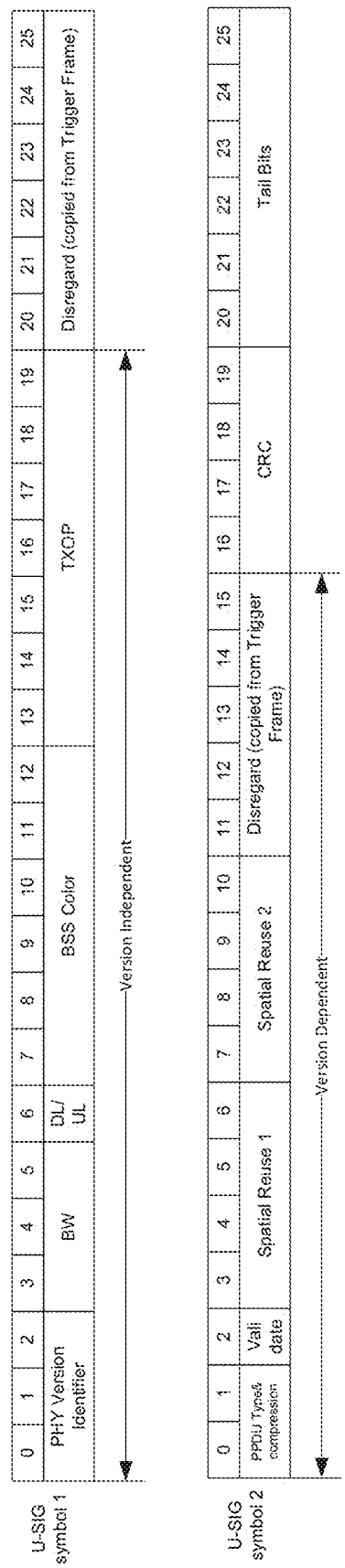
FIG. 3 shows a U-SIG design for a TB PPDU in 802.11be Release 1.

FIG. 3 shows a U-SIG design for a TB PPDU in 802.11be Release 1. The bits contained in the U-SIG's first symbol of TB PPDU convey information about the PHY version (e.g. 802.11be or a later version of the standard), the BW (e.g. 20 MHz, 40 MHz etc.), whether it is a DL or UL transmission, the BSS Color which differentiates between possibly different neighboring BSS values, TXOP which may include duration of the TXOP and/or how long the transmitter is taking advantage of the channel resources. The bits contained in the U-SIG's second symbol, for a TB PPDU, convey information about a PPDU type (e.g. MU, TB), spatial reuse (e.g. spatial reuse 1 and spatial reuse 2) which allows multiple transmitters to transmit simultaneously on the same resources, an MCS used for the EHT-SIG field and number of OFDM symbols used for the EHT-SIG field, a CRC and 6 zero tail bits used for the convolutional code.

As shown in both FIG. 2 and FIG. 3, the disregard bits are located in the first U-SIG symbol (also in the second U-SIG symbol for the TB PPDU); however, the CRC is computed as a function of all preceding bits which include both first U-SIG symbol and second U-SIG symbol, so the value of the CRC bits (located in the second U-SIG symbol) is a function of the disregard bits located in the first U-SIG symbol.

It should be noted that the disregard bits is also referred to as disregard bits sequence in some embodiments of the present disclosure. Disregard bits and disregard bits sequence may be used without differentiation in the present disclosure.

In current protocol, the disregard bits sequence is 5 bits and all bits are set to '1' in an MU PPDU type, or in other words, the disregard bits sequence in the MU PPDU is set as 31 in decimal format.

In 802.11ax, a trigger frame contains 9 reserved bits and all 9 bits are set to '1'. The 9 reserved bits are copied to the second symbol of the HE-SIG-A field of a TB PPDU. In the current stage of 802.11be development, respective to a TB PPDU, there are 6 disregard bits in the first U-SIG symbol and 5 disregard bits in the second U-SIG symbol. All disregard bits are currently defined (in current stage of 802.11be development) as copied from the trigger frame (similar to 802.11ax operation). Maintaining the same design in 11be as it is in 11ax, the disregard bits copied from the trigger frame will be set to one.

Although a structure of the trigger frame is not presented in the present disclosure, the disregard bits sequence in the trigger frame, MU PPDU and TB PPDU comprise contiguous binary bit '1' which can lead to high PAPR, and the performance of the U-SIG field for an MU PPDU and TB PPDU will be impacted in consequence (e.g. with lower PAPR, the power amplifier backoff can be reduced, thereby increasing efficiency).

Figure 4:
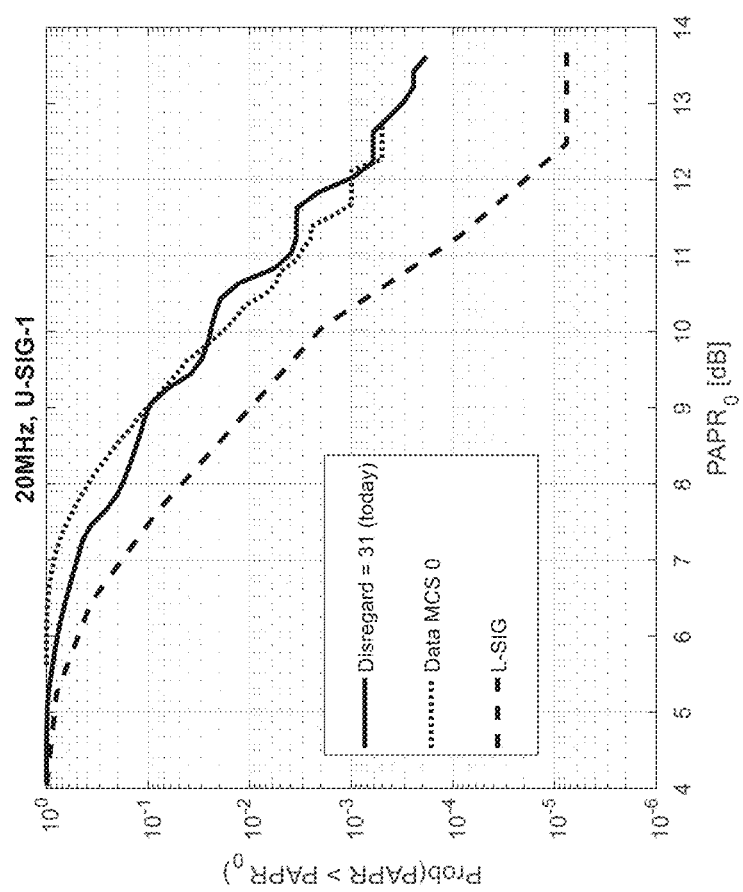
FIG. 4 shows a complimentary cumulative density function (CCDF) of the PAPR of the first U-SIG symbol for a 20 MHz BW with an MU PPDU.

FIG. 4 shows a complimentary cumulative density function (CCDF) of the PAPR of the first U-SIG symbol for a 20 MHz BW for an MU PPDU. U-SIG-1 in FIG. 4 means the first symbol of the U-SIG field. With the design in the prior art, the PAPR of U-SIG symbols is high for all bandwidth scenarios. For example, in the 20 MHz case, the CCDF of the PAPR of the first U-SIG symbol is compared with that of the data portion (assuming MCS 0=BPS K rate 1/2) and with that of a legacy signal (L-SIG) field.

As shown in FIG. 4, the U-SIG-1 PAPR is higher on average than that of the data for a large proportion of the range. It is also not smooth (contains 'steps') because of the large number of fixed bits, which means the central limit theorem doesn't apply and hence the distribution of the time-domain signal isn't complex Gaussian.

Figure 5:
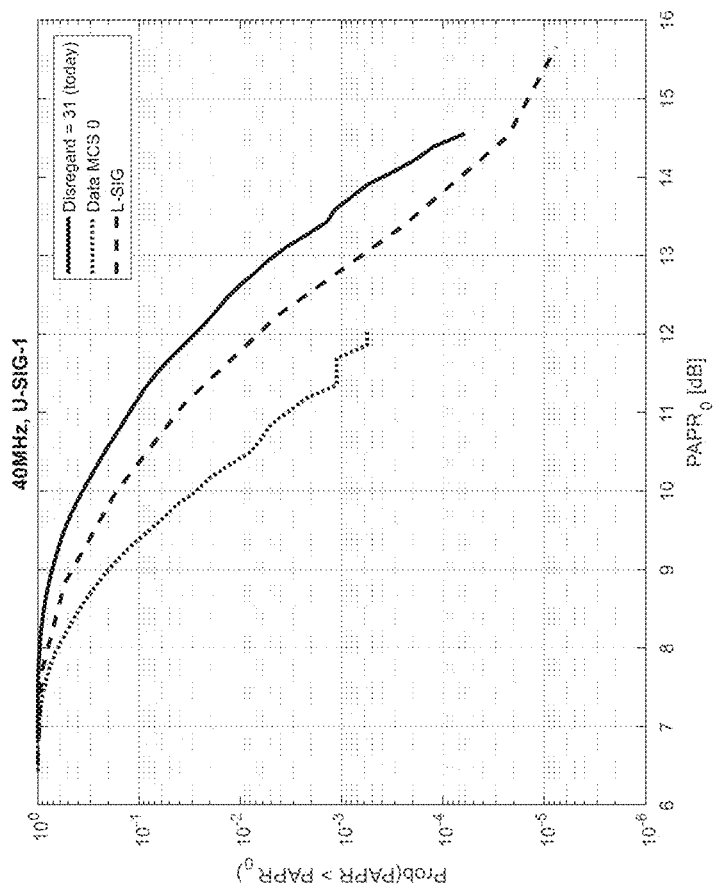
FIG. 5 shows a CCDF of the PAPR of the first U-SIG symbol for a 40 MHz BW with an MU PPDU.

FIG. 5 shows a CCDF of the PAPR of the first U-SIG symbol for a 40 MHz BW. U-SIG-1 in FIG. 5 means the first symbol of the U-SIG field. Current standard defines that pre-EHT fields that are duplicated on every 20 MHz portion (e.g. L-SIG, U-SIG etc.) undergo per-20 MHz phase rotation in order to reduce the PAPR. However, as shown in the FIG. 5 for the first U-SIG symbol in the 40 MHz case, the U-SIG PAPR is higher than both data and L-SIG, which means it is the limiting factor in terms of performance (it may define the power amplifier backoff).

It can be seen based on the simulation result from FIG. 4 and FIG. 5 that it is therefore of importance to reduce the PAPR of the U-SIG field.

In order to solve the problem above, the present disclosure provides a method and/or apparatus to reduce the PAPR of the trigger frame, MU PPDU and TB PPDU. The present disclosure provides a communication device comprising a processor, configured to: operate on a first disregard bits sequence to obtain a second disregard bits sequence, wherein the first disregard bits sequence is with all bits set to '1'; and a transmitter configured to: transmit the PPDU, wherein the PPDU comprises the second disregard bits sequence. It should be noted that, the method and/or apparatus provided in the present disclosure may not restrict it being used for any other PPDUs or frames which have the same problem.

Embodiments present in the present disclosure may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing.

A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device may receive computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Figure 6:
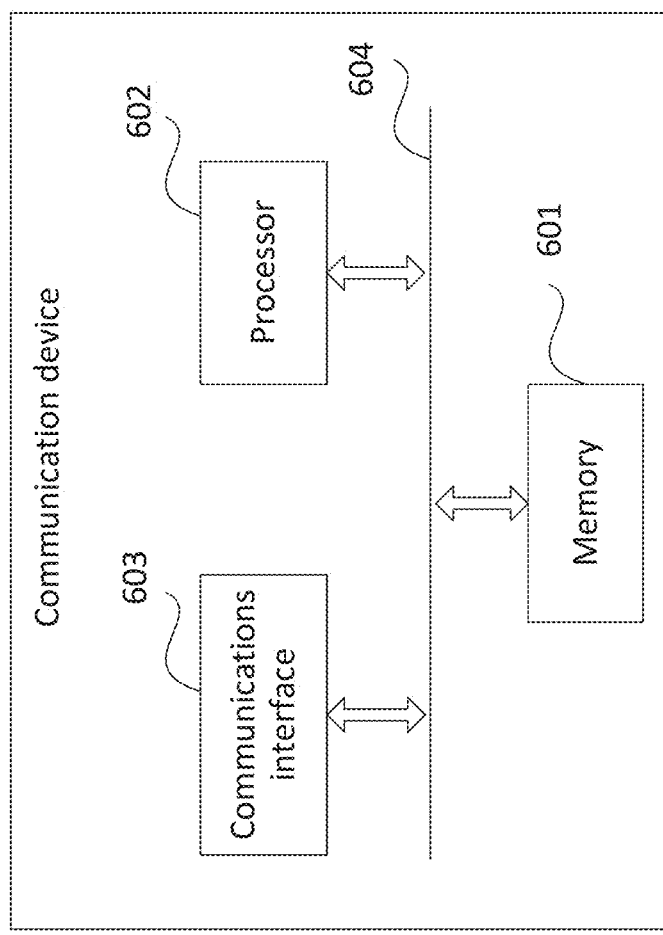
FIG. 6 is a schematic diagram of a possible logical structure of a communication device in the present disclosure according to some embodiments.

FIG. 6 is a schematic diagram of a possible logical structure of a communication device in the present disclosure according to some embodiments. The communication device includes a processor 602. In some embodiments of the present disclosure, the processor 602 may be configured to control and manage one or more actions of the communication device, e.g. configured to execute a code for operating on a first disregard bits sequence to reduce the PAPR and/or to process the data transmitted and/or received in the AP. Optionally, the communication device may further include a memory 601 and a communications interface 603. The processor 602, the communications interface 603, and the memory 601 may be connected to each other or may be connected to each other by using a bus 604. The communications interface 603 is configured to support the communication device in performing communication, and the memory 601 is configured to store program code and data of the communication device. The processor 602 calls the code stored in the memory 601 to perform control and management. The memory 601 may or may not be coupled to the processor 602.

The processor 602 may be a central processing unit, a general-purpose processor, a digital signal processor, an application-specific integrated circuit, a field programmable gate array or another programmable logical device, a transistor logical device, a hardware component, or any combination thereof. The processor 602 may implement or execute various example logical blocks, modules, and circuits described with reference to content disclosed in the present disclosure. Alternatively, the processor 602 may be a combination of processors implementing a computing function, for example, a combination of one or more microprocessors, or a combination of the digital signal processor and a microprocessor. The bus 604 may be a peripheral component interconnect (PCI) bus, an extended industry standard architecture (EISA) bus, or the like. The bus may be classified into an address bus, a data bus, a control bus, and the like.

According to the communication device provided above, in some embodiments, the U-SIG may comprise at least a first U-SIG symbol and a second U-SIG symbol.

In some embodiments, wherein operate on a first disregard bits sequence to obtain a second disregard bits sequence may comprise: set the value of the first disregard bits sequence to a sequence comprising at least one '0' bit; or change the value of the validate bit immediately after the first disregard bits sequence to '0' and modifying the value of the first disregard bits sequence to a pre-set value; or change the location of the first disregard bits sequence among U-SIG fields and change the value of the first disregard bits; or replace a portion of the first disregard bits sequence with a cyclic redundancy check, CRC.

The first disregard bits sequence in the present disclosure may be the predefined bits sequence in a prior art, e.g. present IEEE protocol. The first disregard bits sequence in some embodiments may be 5 or 6 bits and all bits are set as binary '1', e.g. in the MU PPDU or TB PPDU. The first disregard bits sequence may refer to the 6-bit disregard bits of the first U-SIG symbol in the TB PPDU, and/or to the 5-bit disregard bits of the second U-SIG symbol in the TB PPDU. It should be noted that the disregard bits sequence may include other number of binary bits and 5-bit or 6-bit is not a limitation in the present disclosure.

In one embodiment, the value of the first disregard bits sequence is set to a sequence comprising at least one '0' bit in binary. Optionally, the first disregard bits sequence may further comprise at least one '1' bit in binary. The at least one '0' bit in binary may be any bit of the disregard bits sequence.

The first disregard bits sequence is set to a sequence comprising at least one '0' bit in binary may comprise the first disregard bits sequence of MU PPDU is set to for example one of the sequence in the binary set {'00101', '00110', '01001', '01111', '10011', '10101', '11000', '10110'}; or the first disregard bits sequence of TB PPDU for the first U-SIG symbol is set to one of the sequence in the set {'010010', '010011', '010100', '010101', '011100', '011101', '011110', '011111', '100101', '100010', '110100', '111000', '111001'}; or the first disregard bits sequence of TB PPDU for the second U-SIG symbol is set to one of the sequence in the set {'01001', '01101', '01111', '11010', '11011', '11101', '11110', '11111'}; or set a single global value of the first disregard bits sequence within the first U-SIG symbol for different BW values for a TB PPDU, and the first disregard bits sequence is in particularly set as '011110' in binary; or set a single global value of the first disregard bits in the second U-SIG symbol for different bandwidth values for a TB PPDU, and the first disregard bits sequence is in particularly set as '01001' or '11110' in binary.

If the first disregard bits sequence of TB PPDU for the first U-SIG symbol is set to one of the sequence in the set {'010010', '010011', '010100', '010101', '011100', '011101', '011110', '011111', '100101', '100010', '110100', '111000', '111001'}, the first disregard bits sequence of TB PPDU for the second U-SIG symbol may be copied from trigger frame. It should be understood that the first disregard bits sequence of TB PPDU for the second U-SIG symbol may be set to any other value in the set for example {'01001', '01101', '01111', '11010', '11011', '11101', '11110', '11111'}. The value of the first disregard bits sequence of TB PPDU for the second U-SIG symbol is not restricted in this case.

If the first disregard bits sequence of TB PPDU for the second U-SIG symbol is set to one of the sequence in the set {'01001', '01101', '01111', '11010', '11011', '11101', '11110', '11111'}, the first disregard bits sequence of TB PPDU for the first U-SIG symbol may be set for example '011110' in binary (30 in decimal). It should be understood that, the first disregard bits sequence of TB PPDU for the first U-SIG symbol may be set to any other value in the set {'010010', '010011', '010100', '010101', '011100', '011101', '011110', '011111', '100101', '100010', '110100', '111000', '111001'}.

In one embodiment, for a 20 MHz MU PPDU, the disregard bits sequence may be set to for example '00101' (5 in decimal format). For a disregard bits sequence of a first symbol of a TB PPDU, it may comprise 6 bits, and the MSB bit or LSB bit may be set to '0' or '1' in binary, which depends on the definition of standard.

Figure 7:
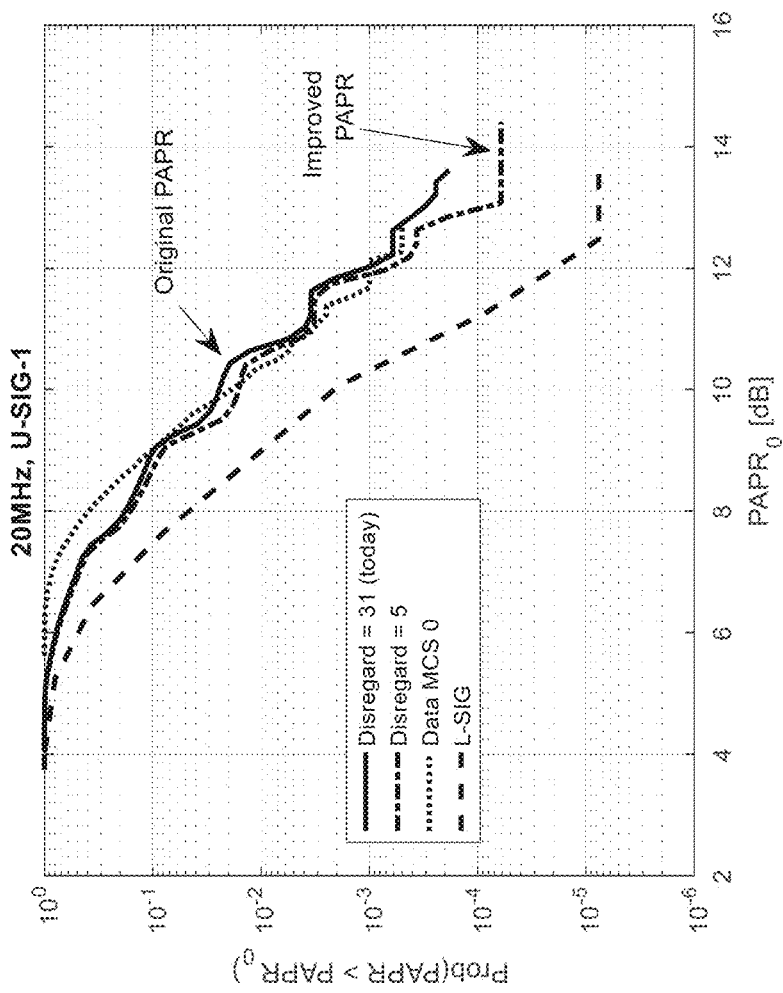
FIG. 7 shows the PAPR when the disregard bits sequence is set to '00101' for a 20 MHz MU PPDU.

FIG. 7 shows the PAPR when the disregard bits sequence is set to '00101' for a MU PPDU. It can be seen that the PAPR is greatly improved when the disregard bits sequence comprises at least one binary '0'.

In one embodiment, for a TB PPDU with 20 MHz BW, replacing the 6 disregard bits sequence in the first U-SIG symbol with one of {'010100', '011101', '011110', '011111'} in binary (20, 29, 30 and 31 in decimal respectively), and copying the 5 disregard bits in the 2nd U-SIG symbol from the Trigger. It should be noted that the set {'010100', '011101', '011110', '011111'} in binary is subset of {'010010', '010011', '010100', '010101', '011100', '011101', '011110', '011111', '100101', '100010', '110100', '111000', '111001'}.

The choice of disregard bits sequence with 31 or 30 in decimal in the first U-SIG symbol leads to lower PAPR also in the second U-SIG symbol.

Figure 8:
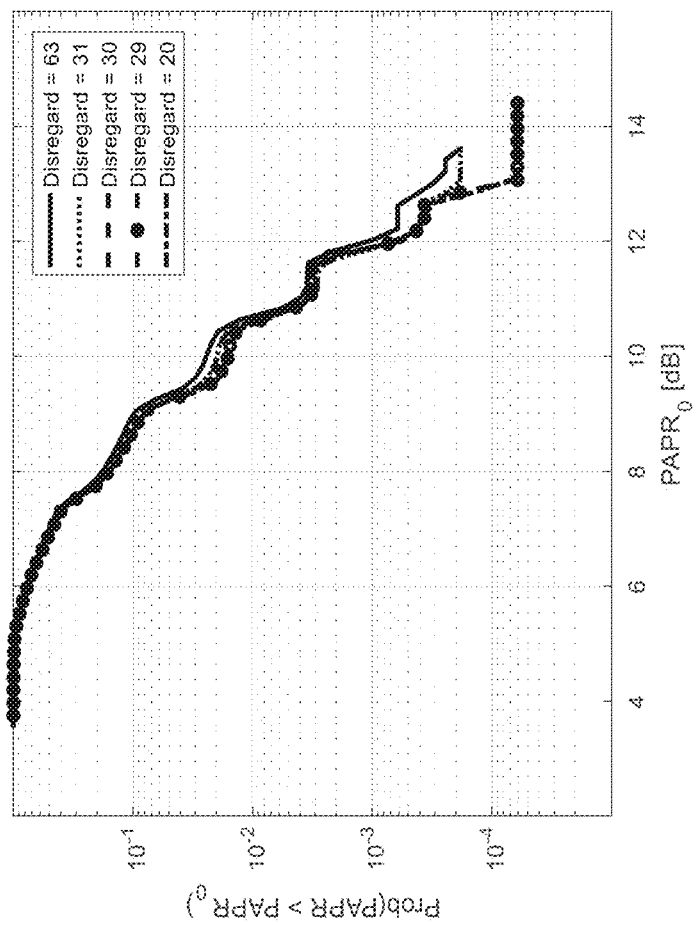
FIG. 8 shows a PAPR CCDF of the first U-SIG symbol for 20 MHz BW.

FIG. 8 shows a PAPR CCDF of the first U-SIG symbol for 20 MHz BW. The disregard bits in the second U-SIG symbol are assumed to be all ones (e.g. '11111').

In one embodiment, for a TB PPDU with 20 MHz BW, replacing the 6 disregard bits in the first U-SIG symbol with '011110' in binary (30 in decimal format), and replacing the 5 Disregard bits in the second U-SIG symbol with one of the set {'01001', '11010', '11011', '11110'} (9, 26, 27 and 30 respectively in decimal format).

Figure 9:
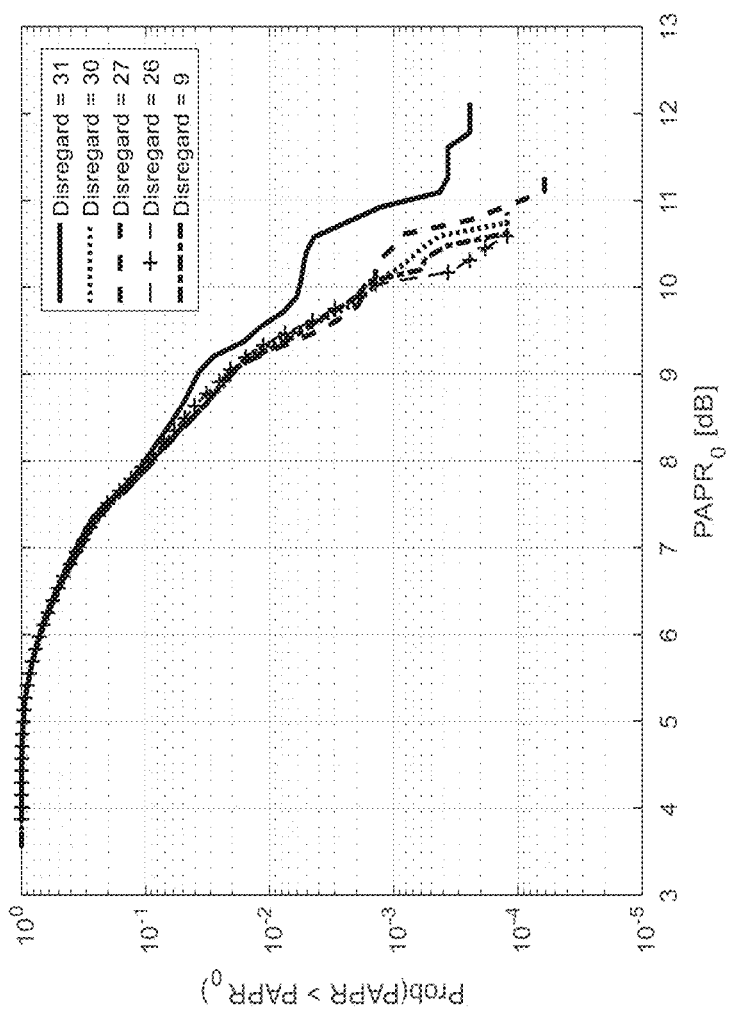
FIG. 9 shows a PAPR CCDF of the second U-SIG symbol with 20 MHz BW.

FIG. 9 shows a PAPR CCDF of the second U-SIG symbol with 20 MHz BW.

In one embodiment, for a 40 MHz MU PPDU, the disregard bits sequence of the first symbol may be set to for example '00101' in binary (5 in decimal format) or '01001' in binary (9 in decimal format).

Figure 10:
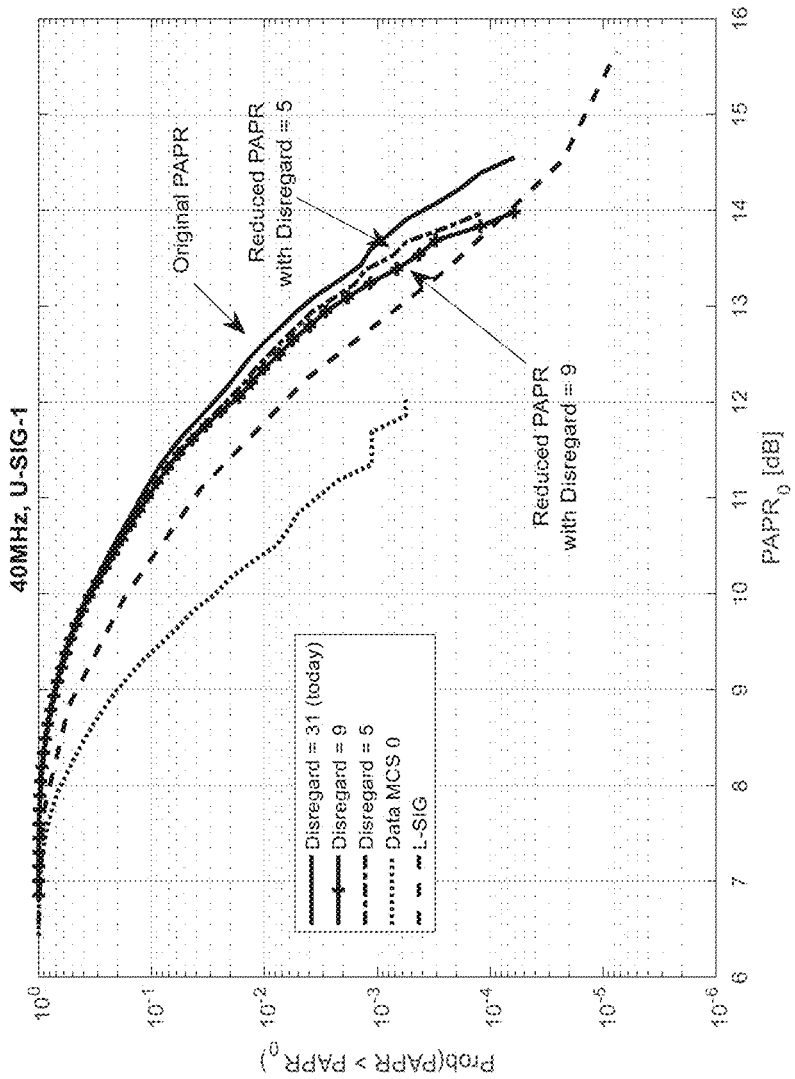
FIG. 10 shows the PAPR of the first symbol for a 40 MHz MU PPDU with the disregard bits sequence set to 5 in decimal.

FIG. 10 shows the PAPR of the first symbol for a 40 MHz MU PPDU with the disregard bits sequence set to 5 in decimal. It can be seen that the PAPR of first symbol can be improved with the disregard bits sequence of the present embodiment.

The disregard bits sequence of the MU PPDU may be set to for example one of the set {'00101', '00110', '01111', '10011'} in binary (5, 6, 15 and 19 respectively in decimal format), and the PAPR of the second U-SIG symbol can be improved in consequence.

Figure 11:
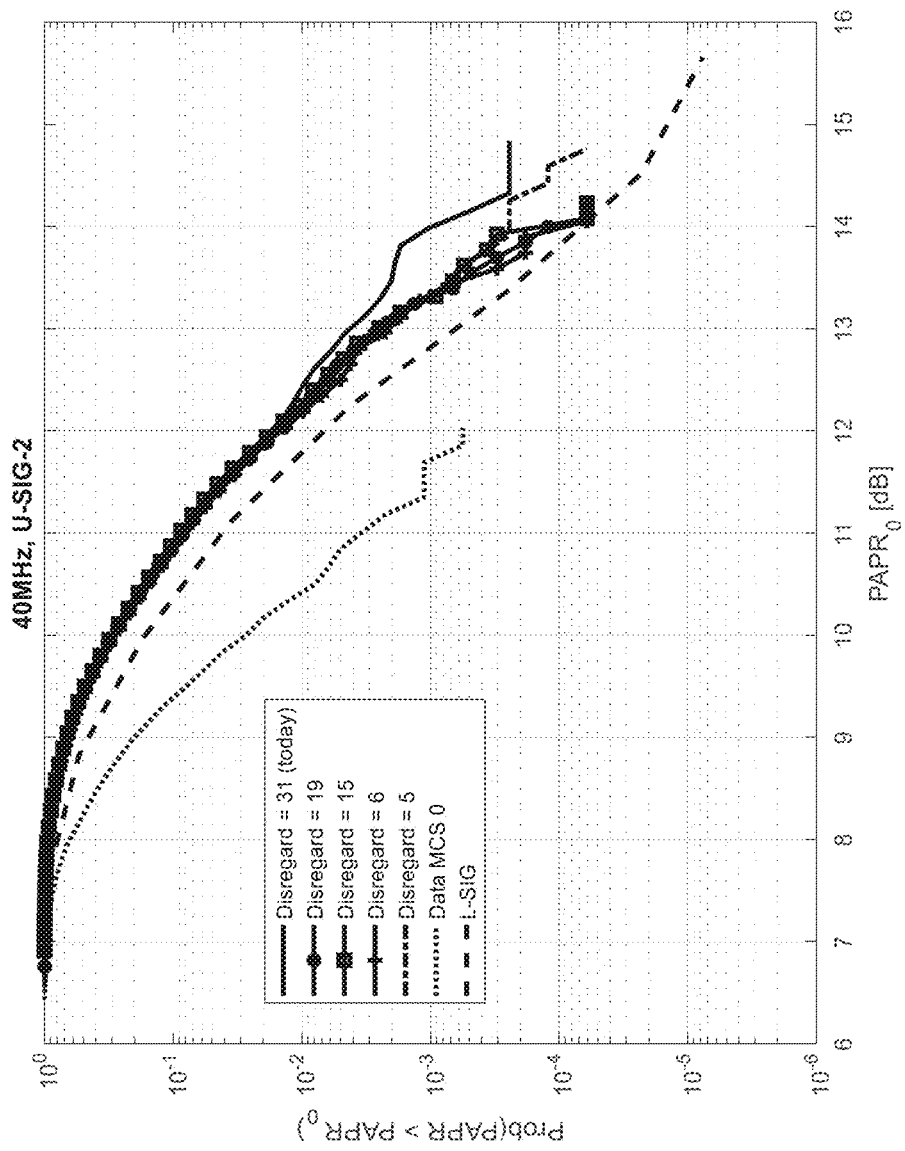
FIG. 11 shows the PAPR of the second symbol for a 40 MHz MU PPDU with the disregard bits sequence set to one of 5, 6, 15 or 19 in decimal.

FIG. 11 shows the PAPR of the second symbol for a 40 MHz MU PPDU with the disregard bits sequence set to one of 5, 6, 15 or 19 in decimal. It can be seen that the PAPR is greatly improved when the disregard bits sequence is set to one of {'00101', '00110', '01111', '10011'} in binary.

Figure 12:
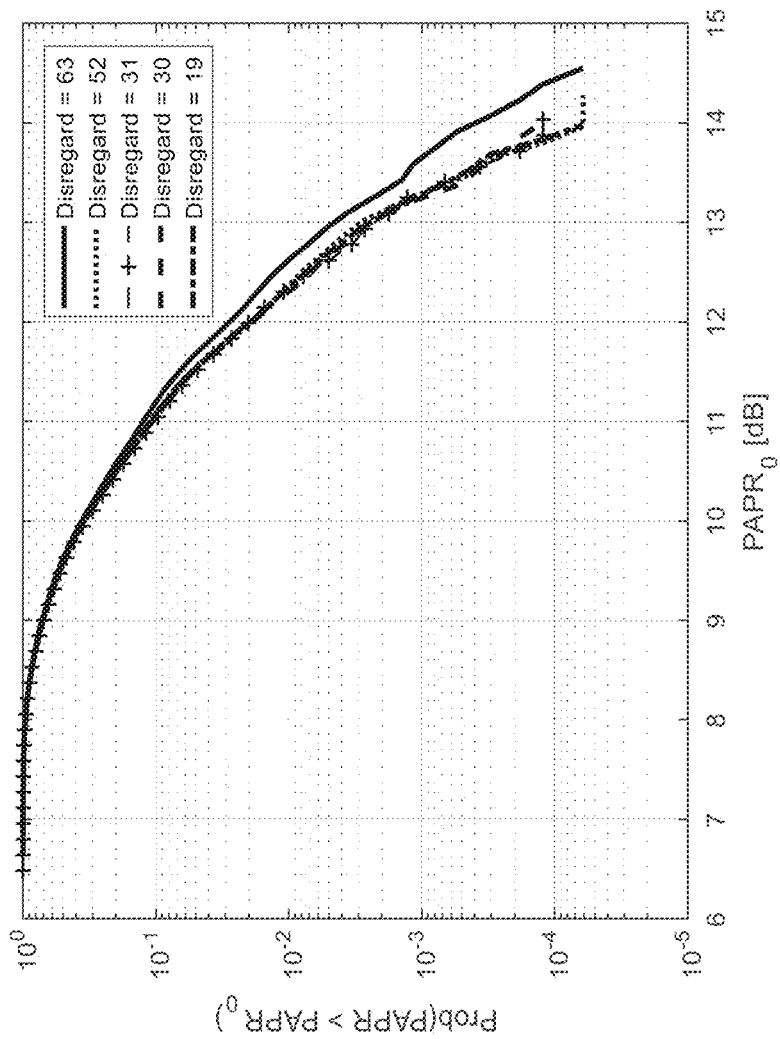
FIG. 12 shows a PAPR CCDF of the first U-SIG symbol for 40 MHz BW with disregard bits sequence set to one of 19, 30, 31 or 52 in decimal for a TB PPDU.

In one embodiment, for a TB PPDU with 40 MHz BW, replacing the 6-bit disregard bits sequence in the first U-SIG symbol with {'010011', '011110', '011111', '110100'} (19, 31 and 52 respectively in decimal format), and the 5-bit disregard bits sequence in the second U-SIG symbol may be copied from a trigger frame. FIG. 12 shows a PAPR CCDF of the first U-SIG symbol for 40 MHz BW with disregard bits sequence set to one of 19, 30, 31 or 52 in decimal for a TB PPDU. The PAPR of the first symbol for 40 MHz BW can then be improved. It should be noted that the set {'010100', '011101', '011110', '011111'} in binary is subset of {'010010', '010011', '010100', '010101', '011100', '011101', '011110', '011111', '100101', '100010', '110100', '111000', '111001'}.

Figure 13:
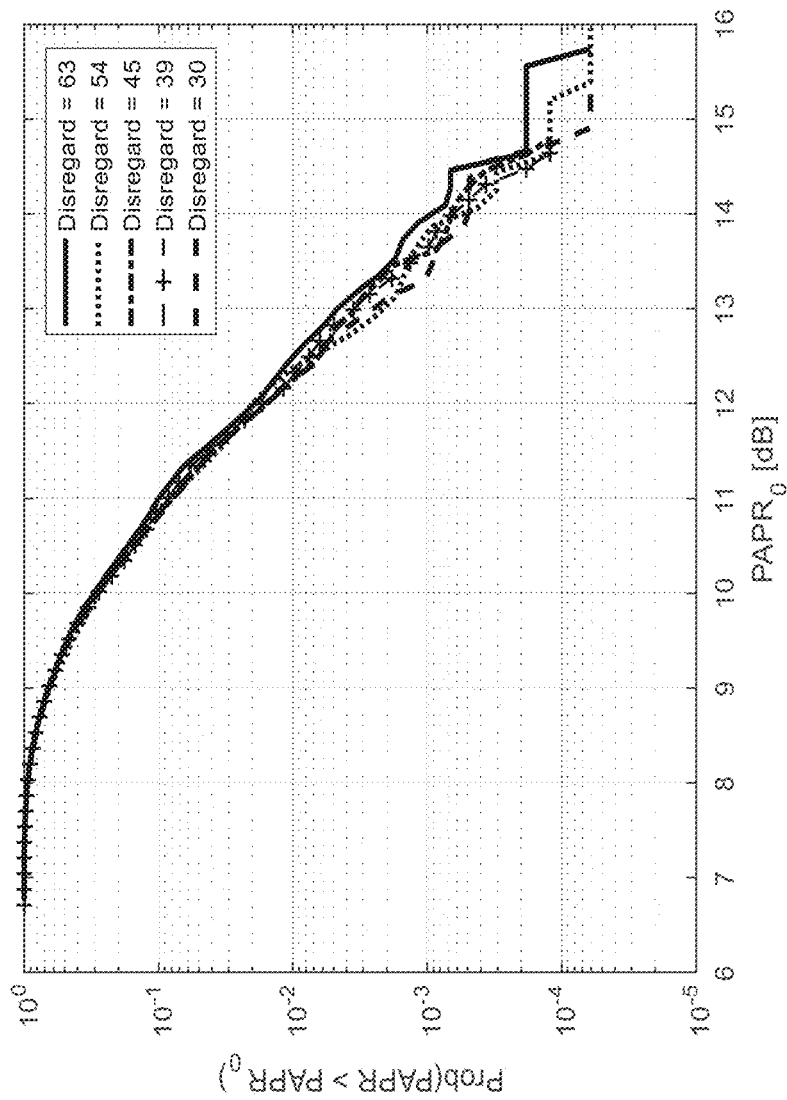
FIG. 13 shows a PAPR CCDF of the second U-SIG symbol for 40 MHz BW with disregard bit sequence set to one of 30, 39, 45 or 54 in decimal format.

FIG. 13 shows a PAPR CCDF of the second U-SIG symbol for 40 MHz BW with disregard bit sequence set to one of 30, 39, 45 or 54 in decimal format. It can be seen that a choice of disregard bit sequence set to 30 in decimal in the first U-SIG symbol leads to lower PAPR also in the second U-SIG symbol. Other values for reducing the second U-SIG symbol's PAPR are also marked.

In one embodiment, for the 80 MHz MU PPDU considering the first U-SIG symbol, the disregard bits sequence may be set to one of {'00101', '01111', '11000'} in binary (5, 15 and 24 respectively in decimal format).

Figure 14:
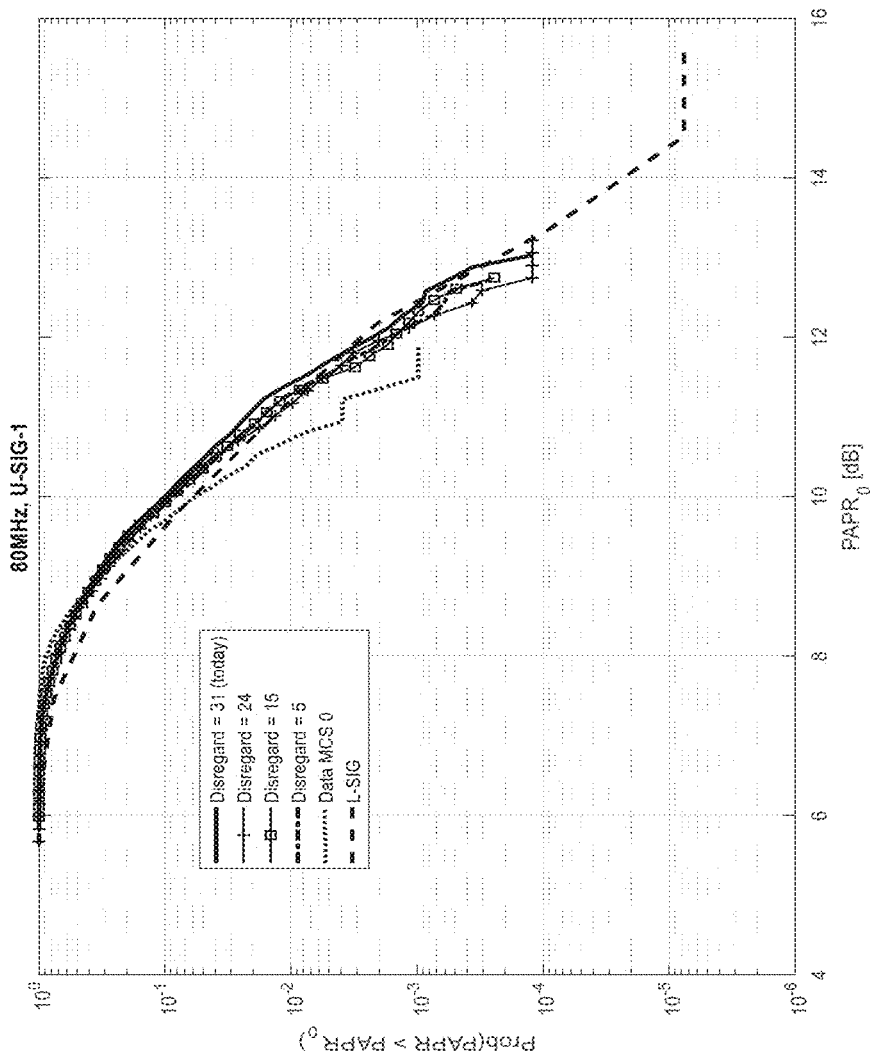
FIG. 14 shows the PAPR for 80 MHz MU PPDU of the first U-SIG symbol with disregard bits sequence set to one of 5, 15, or 24 in decimal.

FIG. 14 shows the PAPR for 80 MHz MU PPDU of the first U-SIG symbol with disregard bits sequence set to one of 5, 15, or 24 in decimal. It can be seen that the PAPR of the first U-SIG symbol be improved with the disregard bits sequence set to one of 5, 15, or 24 in decimal.

In one embodiment, for the 80 MHz MU PPDU considering the second U-SIG symbol, the disregard bits sequence may be set to '00101', '10011' in binary (5 and 19 respectively in decimal format).

Figure 15:
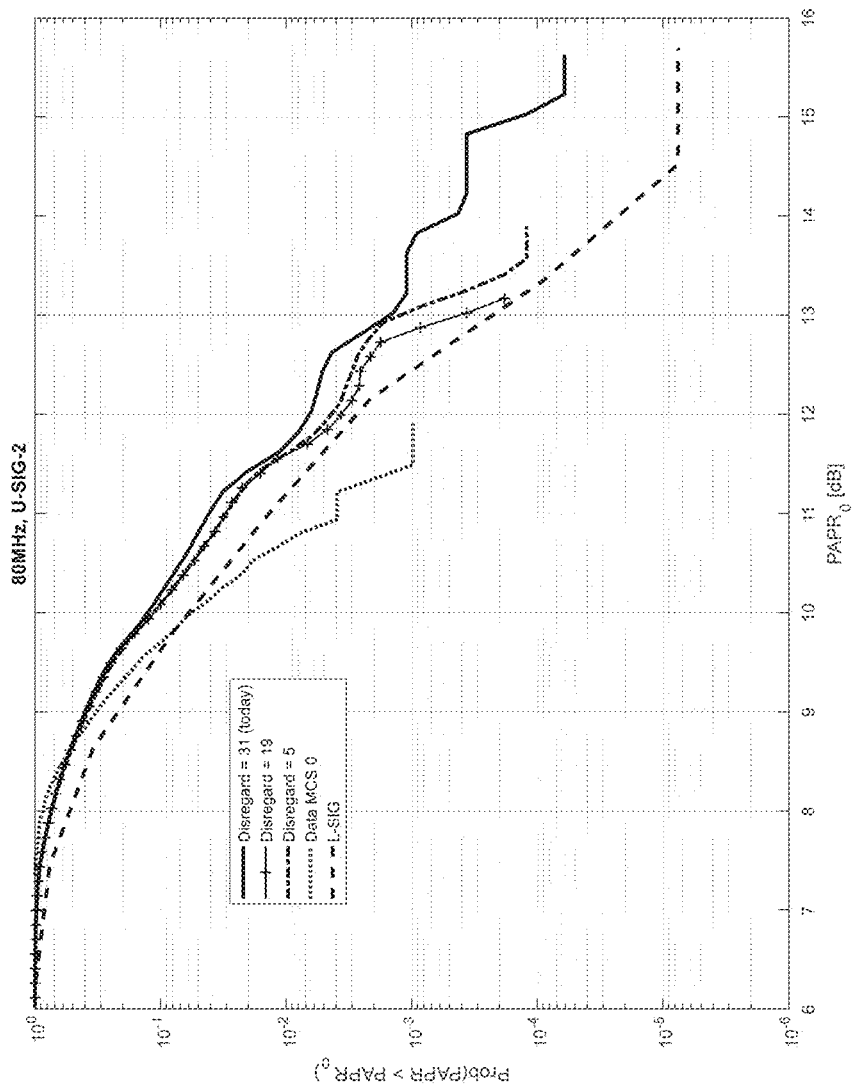
FIG. 15 shows the PAPR for 80 MHz MU PPDU of the second U-SIG symbol with disregard bits sequence set to one of 5 or 19 in decimal.

FIG. 15 shows the PAPR for 80 MHz MU PPDU of the second U-SIG symbol with disregard bits sequence set to one of 5 or 19 in decimal. It can be seen that the PAPR of the second U-SIG symbol can be improved with the disregard bits sequence set to 5 or 19 in decimal.

In order to improve the PAPR of both the first and the second U-SIG symbol, an optimal disregard bits sequence may be set to '00101' in binary for a 80 MHz MU PPDU.

In one embodiment, for a TB PPDU with 80 MHz BW, replacing the 6-bit disregard bits sequence in the first U-SIG symbol with {'011100', '011111', '100010', '111000'} in binary (28, 31, 34 and 56 respectively in decimal), and the 5-bit disregard bits sequence in the second U-SIG symbol may be copied from the trigger frame. It should be noted that the set {'010100', '011101', '011110', '011111'} in binary is subset of {'010010', '010011', '010100', '010101', '011100', '011101', '011110', '011111', '100101', '100010', '110100', '111000', '111001'}.

Figure 16:
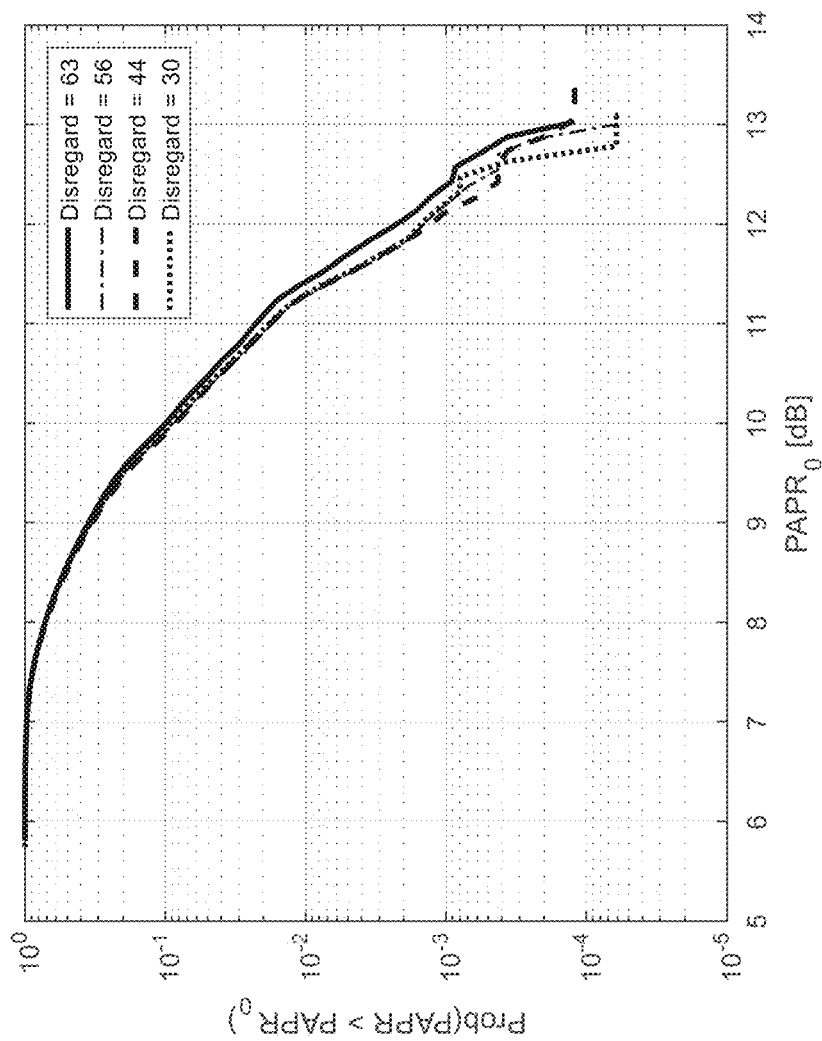
FIG. 16 shows the PAPR for 80 MHz TB PPDU of the first U-SIG symbol with disregard bits sequence set to one of 30, 44 or 56 in decimal.

FIG. 16 shows the PAPR for 80 MHz TB PPDU of the first U-SIG symbol with disregard bits sequence set to one of 30, 44 or 56 in decimal. The PAPR of the first U-SIG symbol can be improved with the disregard bits sequence set to one of 30, 44 or 56 in decimal. The disregard bits sequence in the second U-SIG symbol are all '1' in binary.

In one embodiment, for a TB PPDU with 80 MHz BW, replacing the 6-bit disregard bits sequence in the first U-SIG symbol with '011110' in binary (30 in decimal format), and replacing the 5-bit disregard bits sequence in the second U-SIG symbol with one of {'001001', '011010', '011011', '011110', '011111'} in binary (9, 26, 27, 30 and 31 respectively in decimal).

Figure 17:
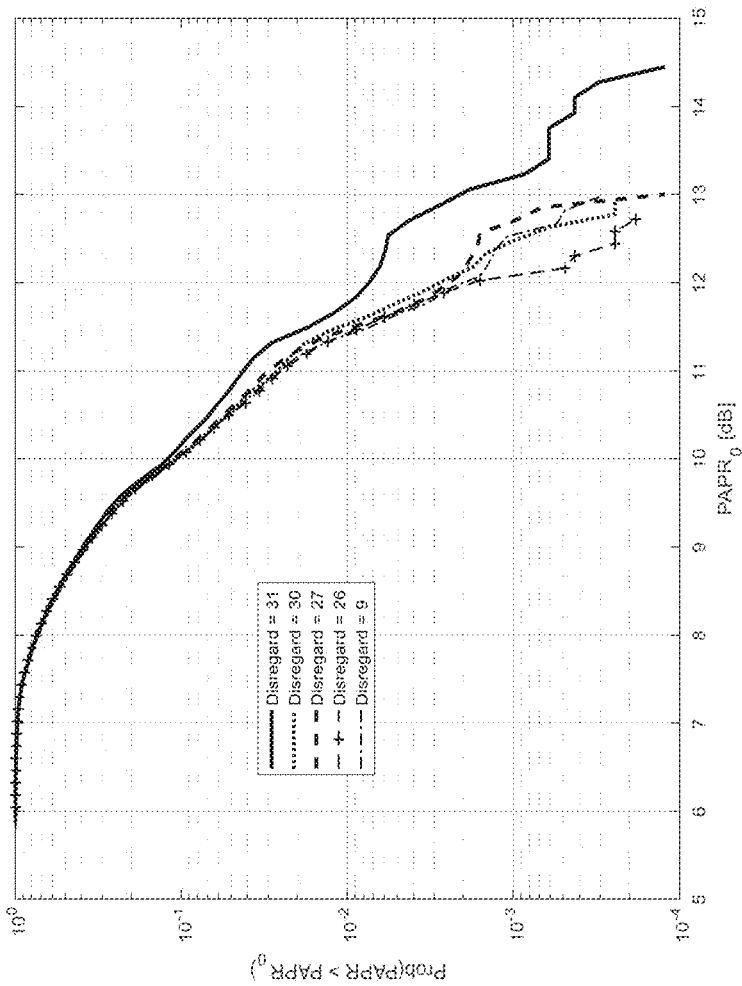
FIG. 17 shows the PAPR of the second symbol for 80 MHz TB PPDU with disregard bits sequence set to 30 in decimal in the first U-SIG symbol and set to one of 9, 26, 27, 30 or 31 in decimal for the second U-SIG symbol.

FIG. 17 shows the PAPR of the second symbol for 80 MHz TB PPDU with disregard bits sequence set to 30 in decimal in the first U-SIG symbol and set to one of 9, 26, 27, 30 or 31 in decimal for the second U-SIG symbol. It can be seen that the PAPR can be improved with the disregard bits sequence set to 30 in decimal in the first U-SIG symbol and set to one of 9, 26, 27, 30 or 31 in decimal for the second U-SIG symbol.

Figure 18:
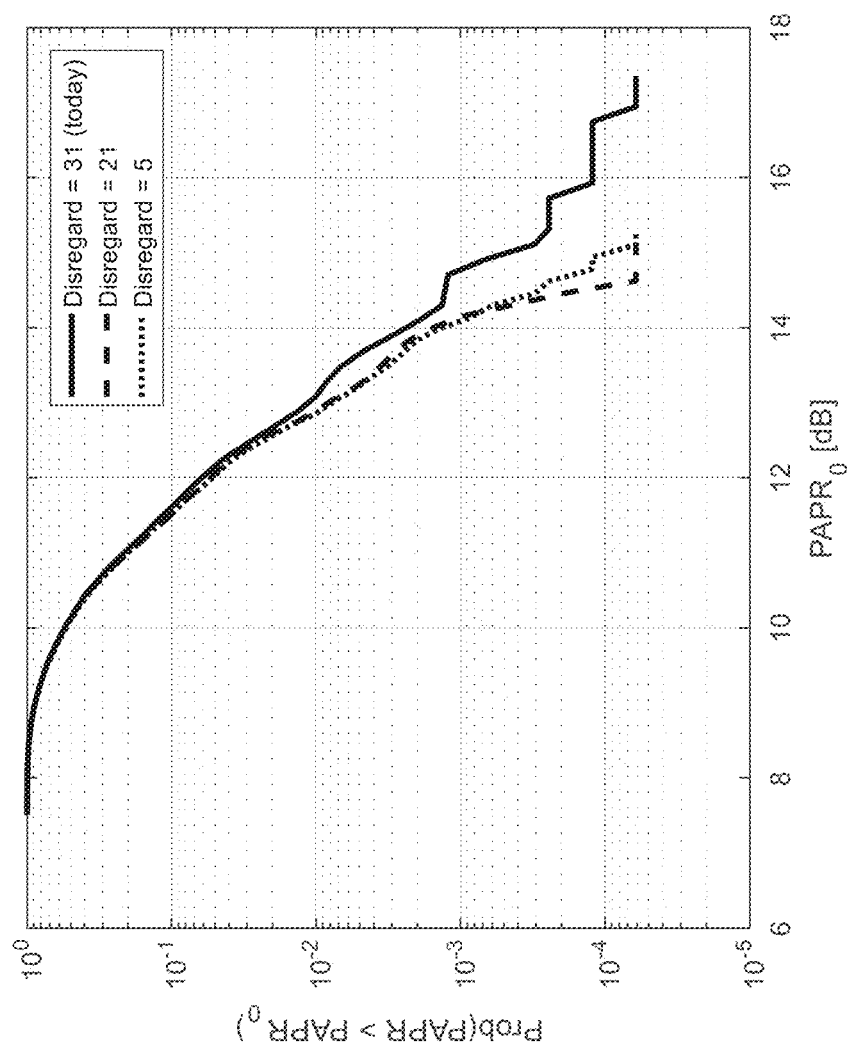
FIG. 18 shows the PAPR of the second symbol for 160 MHz MU PPDU with disregard bits sequence set to 5 or 21 in decimal in the first U-SIG symbol.

In one embodiment, for a 160 MHz MU PPDU, the disregard bits sequence may be set to one of {'00101', '10101'} in binary (5 and 21 respectively in decimal format). FIG. 18 shows the PAPR of the second symbol for 160 MHz MU PPDU with disregard bits sequence set to 5 or 21 in decimal in the first U-SIG symbol. The value 21 in decimal yields best improvement for the second U-SIG symbol and the value 5 in decimal yields a similar (almost as good) improvement.

In one embodiment, for a TB PPDU with 160 MHz BW, replacing the 6-bit disregard bits sequence in the first U-SIG symbol with {'011110', '110011', '111001'} in binary (30, 51 and 57 respectively in decimal), and the 5-bit disregard bits in the second U-SIG symbol may be copied from the trigger frame. It should be noted that the set {'010100', '011101', '011110', '011111'} in binary is subset of {'010010', '010011', '010100', '010101', '011100', '011101', '011110', '011111', '100101', '100010', '110100', '111000', '111001'}.

Figure 19:
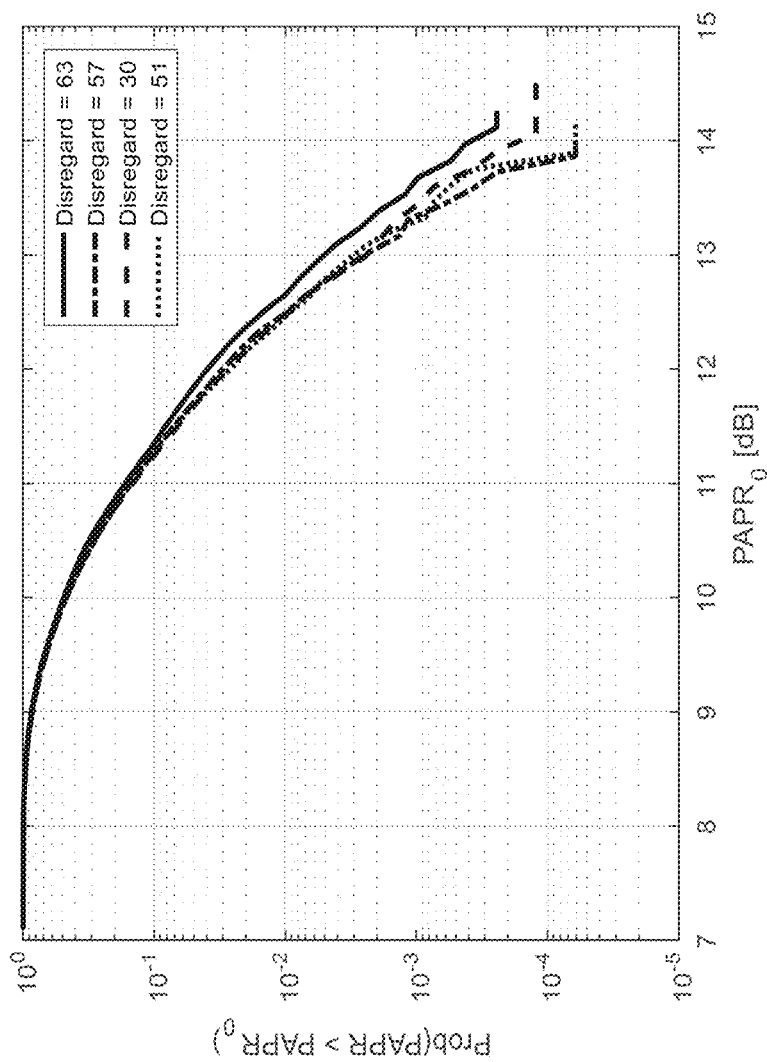
FIG. 19 shows the PAPR of the first symbol for 160 MHz TB PPDU with disregard bits sequence set to one of 30, 51 or 57 in decimal in the first U-SIG symbol.

FIG. 19 shows the PAPR of the first symbol for 160 MHz TB PPDU with disregard bits sequence set to one of 30, 51 or 57 in decimal in the first U-SIG symbol. The PAPR for the first U-SIG symbol can be then improved. The disregard bits in the second U-SIG symbol are assumed to be set all '1' in binary.

In one embodiment, for a TB PPDU with 160 MHz BW, replacing the 6-bit disregard bits sequence in the first U-SIG symbol with '011110' in binary (30 in decimal format), and replacing the 5-bit disregard bits sequence in the second U-SIG symbol with one of {'01001', '01111', '11101', '11110'} (9, 15, 29 and 30 respectively in decimal).

Figure 20:
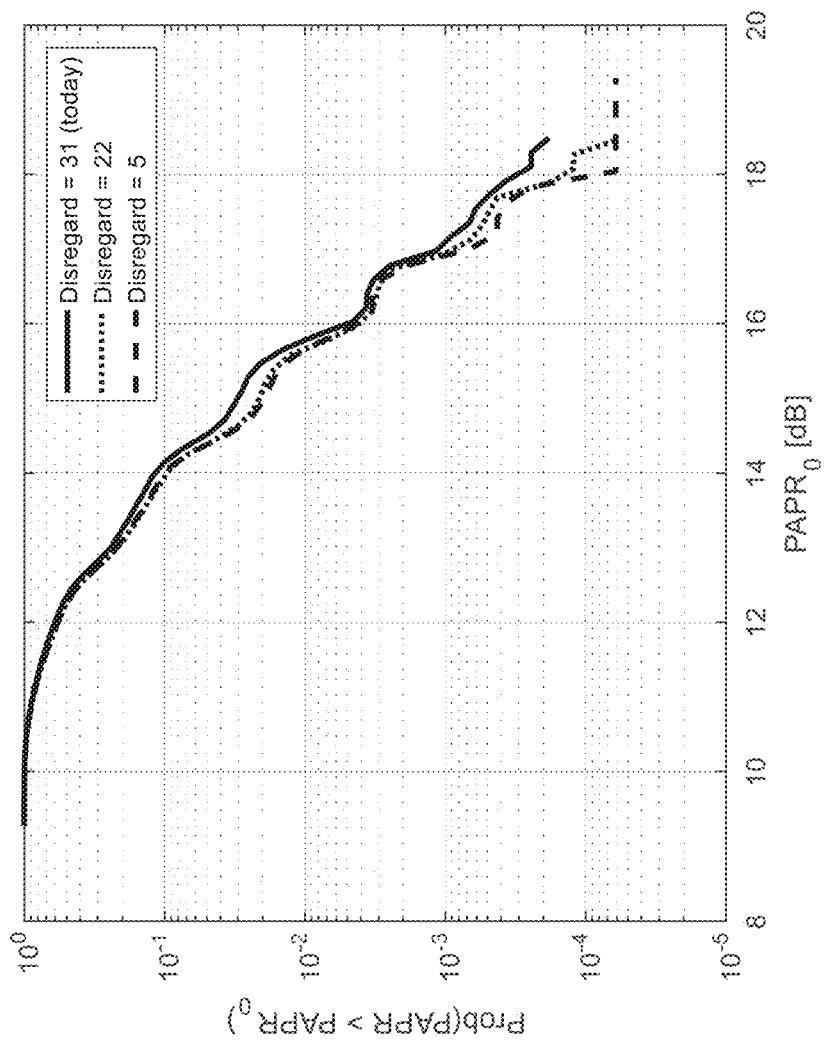
FIG. 20 shows the PAPR of the first symbol for 320 MHz MU PPDU with disregard bits sequence set to 5 or 22 in decimal in the first U-SIG symbol.
Figure 21:
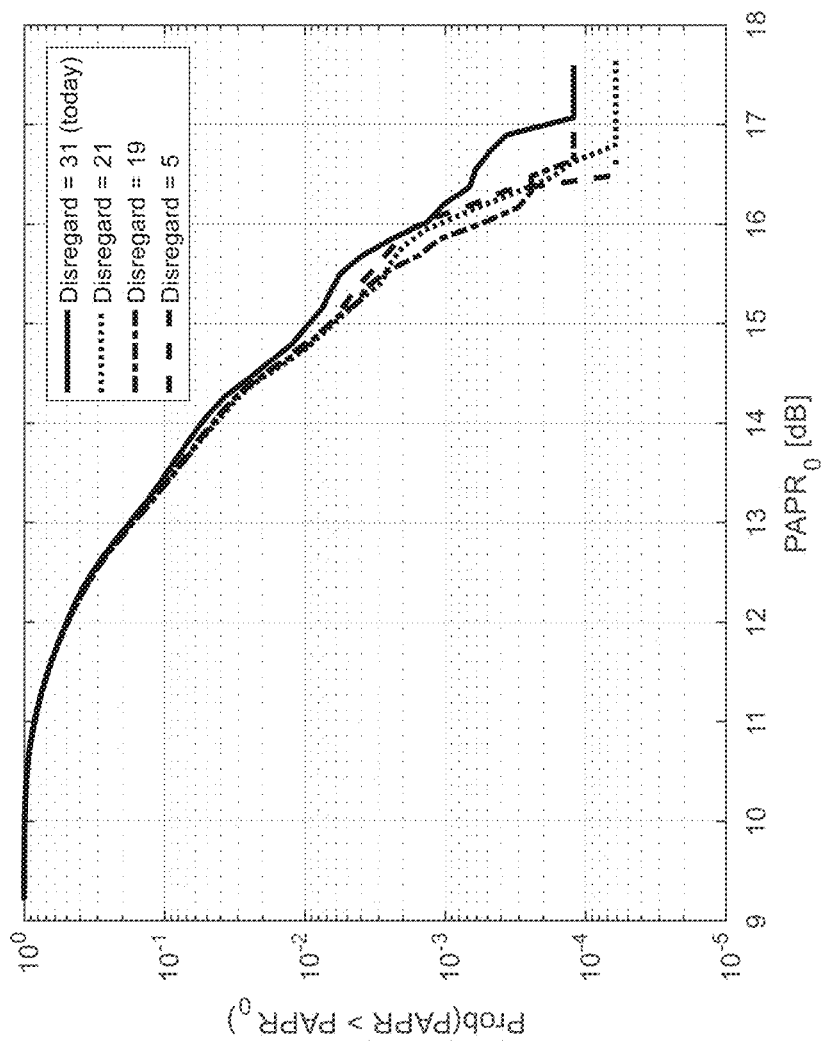
FIG. 21 shows the PAPR of the second symbol for 320 MHz MU PPDU with disregard bits sequence set to 5 or 19 or 21.

In one embodiment, for a 320 MHz MU PPDU, the disregard bits sequence may be set to one of {'00101', '10110'} in binary (5 and 22 respectively in decimal format). FIG. 20 shows the PAPR of the first symbol for 320 MHz MU PPDU with disregard bits sequence set to 5 or 22 in decimal in the first U-SIG symbol. FIG. 21 shows the PAPR of the second symbol for 320 MHz MU PPDU with disregard bits sequence set to 5 or 19 or 21. The value 19 in decimal yields the best improvement for the second U-SIG symbol and the value 5 in decimal yields a similar (almost as good) improvement.

In one embodiment, for a TB PPDU with 320 MHz BW, replacing the 6-bit disregard bits sequence in the first U-SIG symbol with {'010010', '011110', '0111111100101', '111000'} in binary (18, 30, 31, 37, 56 respectively in decimal), and the 5-bit disregard bits in the second U-SIG symbol may be copied from the trigger frame. It should be noted that the set {'010010', '011110', '011111111001011111000'} in binary is subset of {'010010', '010011', '010100', '010101', '011100', '011101', '011110', '011111', '100101', '100010', '110100', '111000', '111001'}.

Figure 22:
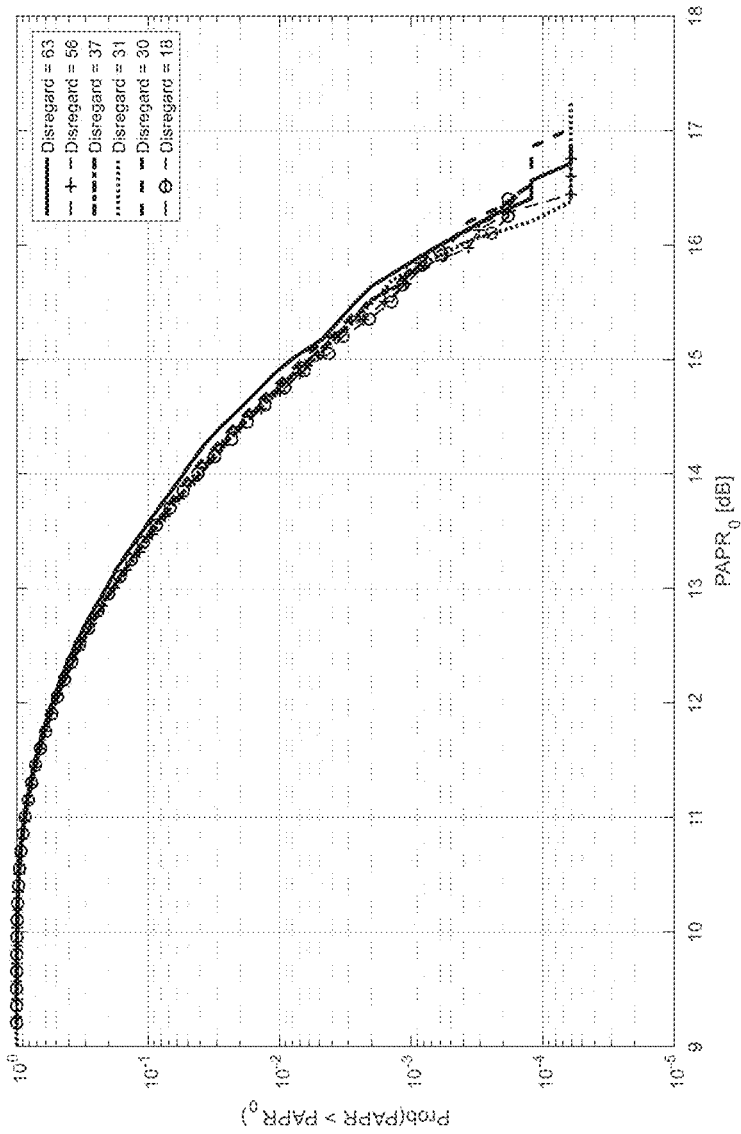
FIG. 22 shows the PAPR of the first U-SIG symbol for 320 MHz TB PPDU with disregard bits sequence set to one of 18, 30, 31, 37 or 56 in decimal in the first U-SIG symbol.

FIG. 22 shows the PAPR of the first U-SIG symbol for 320 MHz TB PPDU with disregard bits sequence set to one of 18, 30, 31, 37 or 56 in decimal in the first U-SIG symbol. The PAPR for the first U-SIG symbol can then be improved. The disregard bits in the second U-SIG symbol are assumed to be set all '1' in binary.

Figure 23:
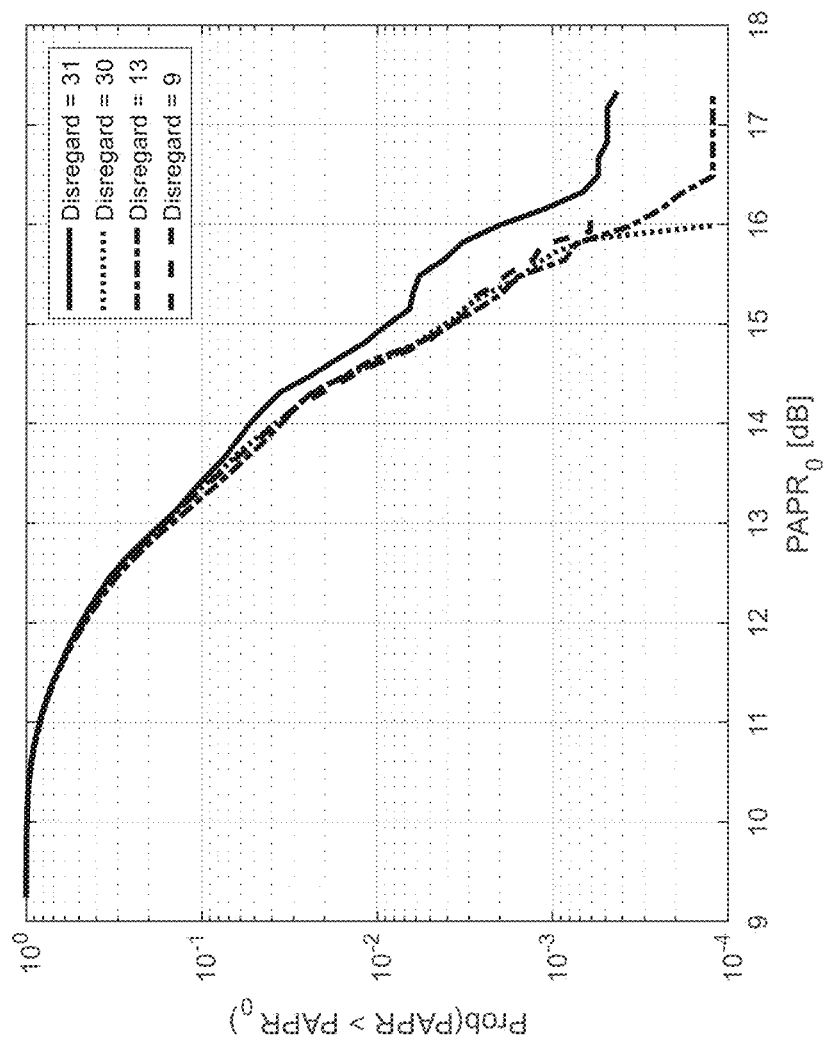
FIG. 23 shows the PAPR of the second U-SIG symbol for a 320 MHz TB PPDU with disregard bits sequence.

In one embodiment, for a TB PPDU with 320 MHz BW, replacing the 6-bit disregard bits sequence in the first U-SIG symbol with '011110' in binary (30 in decimal format), and replacing the 5-bit disregard bits sequence in the second U-SIG symbol with one of {'01001', '01101', '11110'} (9, 13 and 30 respectively in decimal). FIG. 23 shows the PAPR of the second U-SIG symbol for a 320 MHz TB PPDU with disregard bits sequence, in the second U-SIG symbol, set to one of 9, 13 or 30, when the disregard bits sequence in the first U-SIG symbol is set to 30 (in decimal format). The PAPR for the second U-SIG symbol can then be improved.

In one embodiment, using a single global value of the disregard bits within the first U-SIG symbol to reduce the PAPR for all BW values for a TB PPDU. For example, looking at the results from the previous embodiments, by replacing the first disregard bits sequence with 30 in decimal, the PAPR for all BW values can get an improvement.

In one embodiment, using a single global value of the disregard bits within the second U-SIG symbol to reduce the PAPR for all BW values for a TB PPDU. For example, looking at the results from the previous Section, by replacing the first disregard bits sequence with 9 or 30 in decimal. The PAPR for all BW values can get an improvement.

Figure 24:
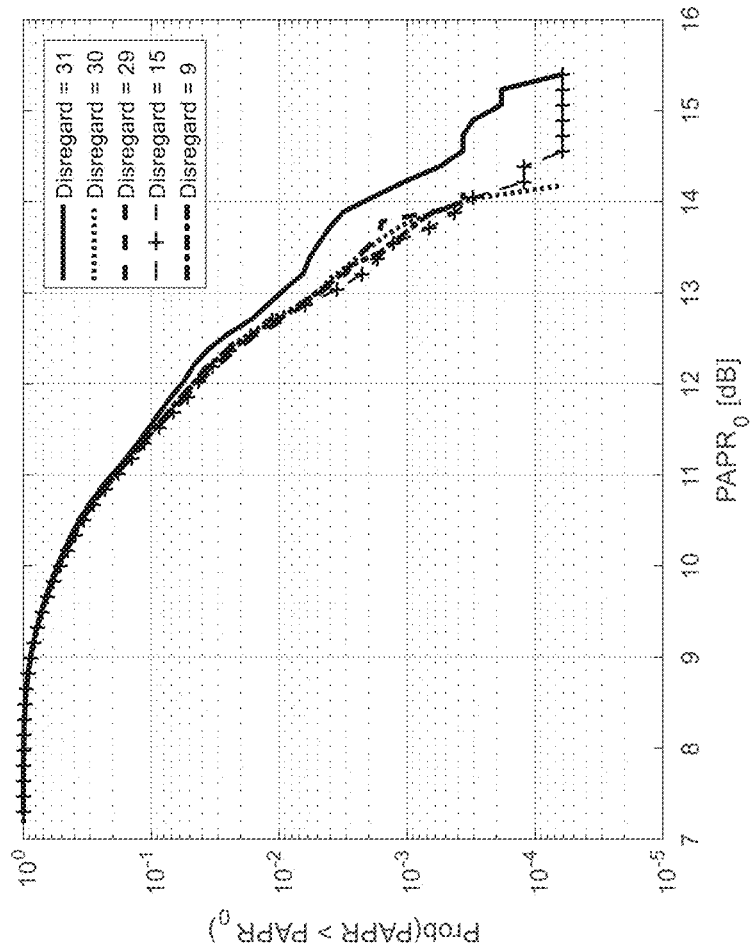
FIG. 24 shows the PAPR of the second symbol for 160 MHz TB PPDU with disregard bits sequence set to 30 in decimal in the first U-SIG symbol and set to one of 9, 15, 29 or 30 in decimal in the second U-SIG symbol.

FIG. 24 shows the PAPR of the second symbol for 160 MHz TB PPDU with disregard bits sequence set to 30 in decimal in the first U-SIG symbol and set to one of 9, 15, 29 or 30 in decimal in the second U-SIG symbol. The PAPR for the second U-SIG symbol can then be improved.

In one embodiment, using a single global value of the Disregard bits to reduce the PAPR for all BW values for an MU PPDU. For example, looking at the results from the previous embodiments, by using disregard bits sequence '00101' in decimal (5 in decimal) we can get an improvement in PAPR for all BW values.

Figure 25:
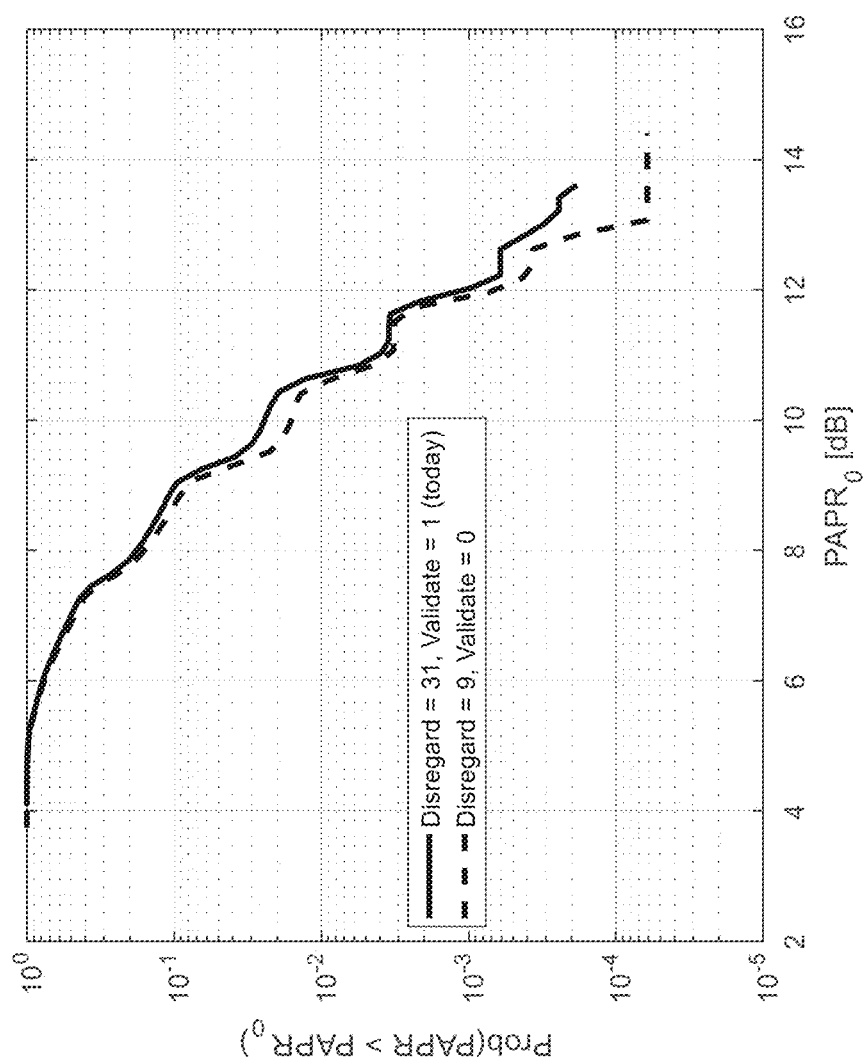
FIG. 25 shows the CCDF for 20 MHz MU PPDU with the validate bit set to '0' in binary and disregard bits sequence set to 9 in decimal.

In one embodiment, operation on a first disregard bits sequence may include change the value of the validate bit immediately after the first disregard bits sequence to '0' and modifying the value of the first disregard bits sequence to a pre-set value. For example, in the MU PPDU using disregard bits sequence of '01001' in binary (9 in decimal) and validate bit of '0' in binary yields PAPR improvement. FIG. 25 shows the CCDF for 20 MHz MU PPDU with the validate bit set to '0' in binary and disregard bits sequence set to 9 in decimal.

In one embodiment, operation on a first disregard bits sequence may include changing the location of the first disregard bits sequence among U-SIG fields and change the value of the first disregard bits. The first disregard bits sequence may be moved to after a basic service set, BSS, color field and before a TXOP field or moved to immediately before the BSS color field.

Figure 26:
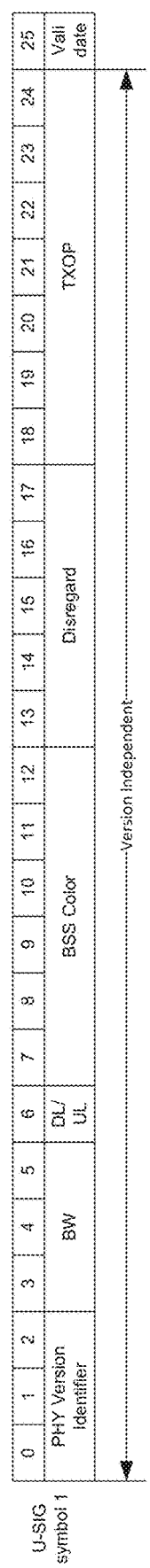
FIG. 26 shows the structure of the MU PPDU after relocating of the disregard bits sequence after BSS color field.

In one option, a combination of relocating the disregard bits sequence and changing the value of the disregard bits sequence so that the PAPR is reduced. For example, moving the disregard bits sequence of a MU PPDU after the BSS color field and before the TXOP field. FIG. 26 shows the structure of the U-SIG field's first symbol for an MU PPDU after relocating of the disregard bits sequence after BSS color field.

Figure 27:
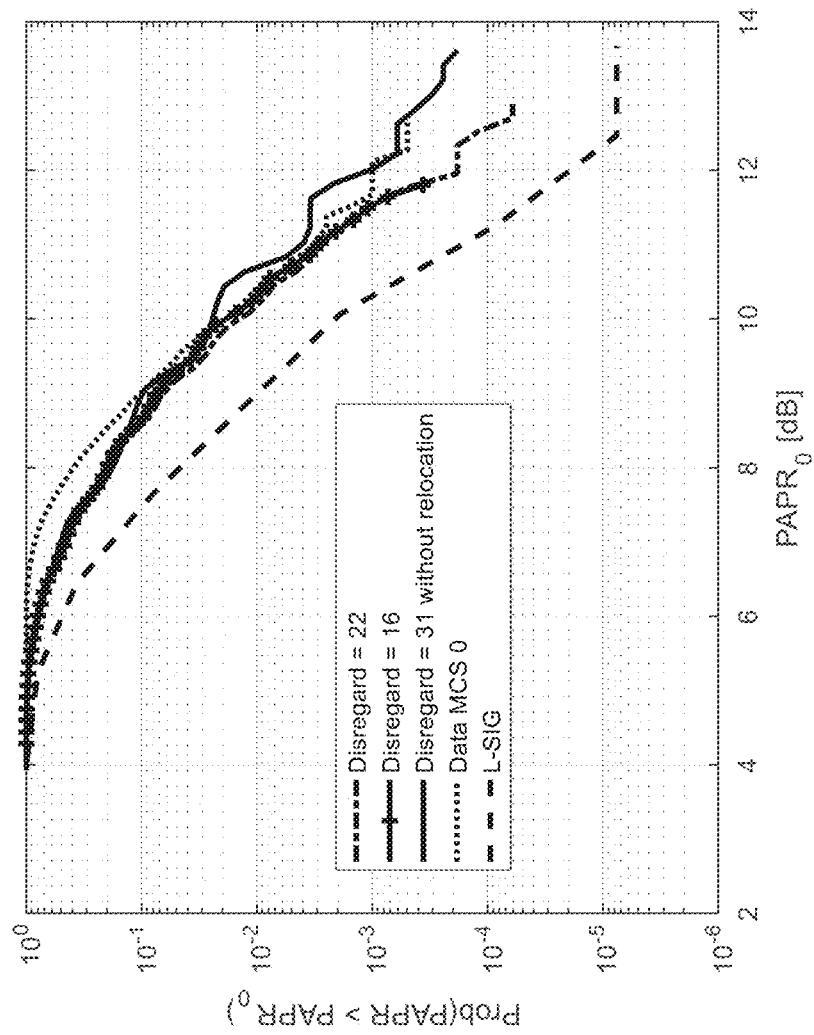
FIG. 27 shows the PAPR for a 20 MHz MU PPDU of the first U-SIG symbols by relocating the disregard bits sequence after BSS color field.
Figure 28:
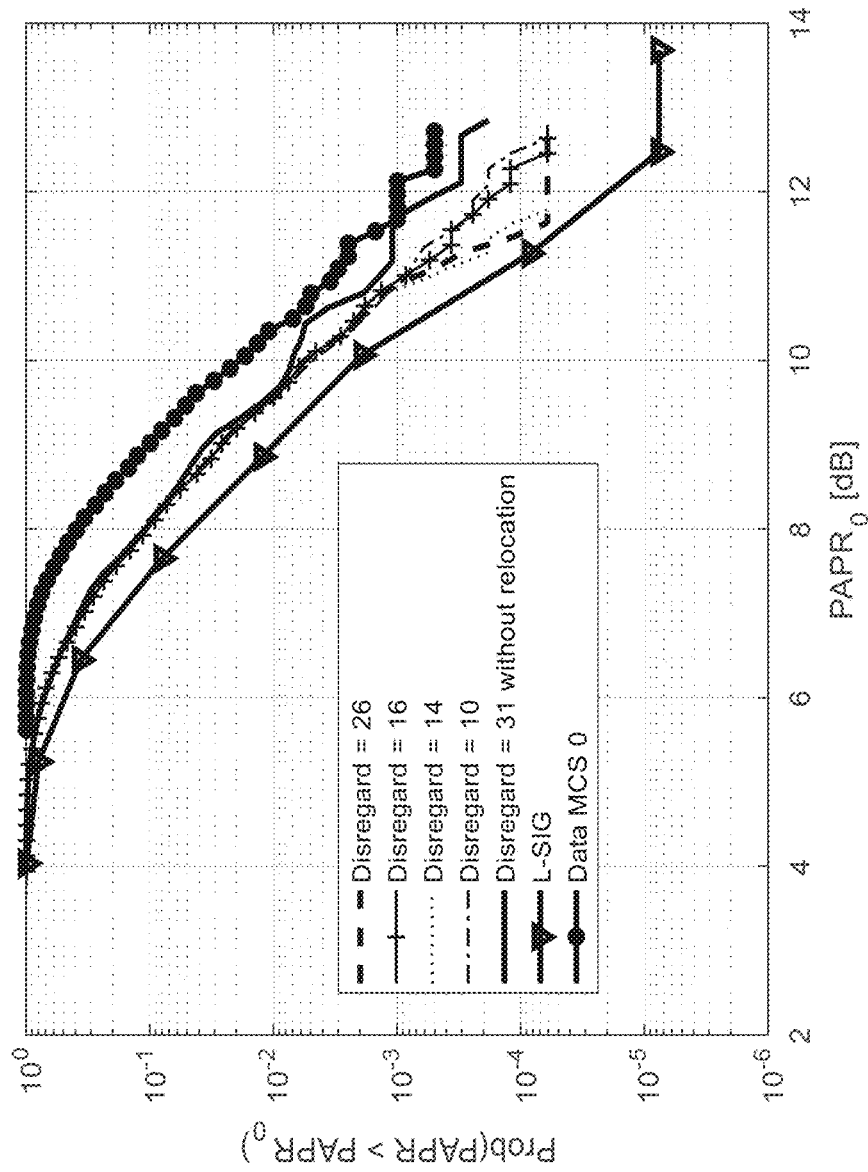
FIG. 28 shows the PAPR for a 20 MHz MU PPDU of the second U-SIG symbols by relocating the disregard bits sequence after BSS color field.

FIG. 27 shows the PAPR for a 20 MHz MU PPDU of the first U-SIG symbol by relocating the disregard bits sequence after BSS color field and FIG. 28 shows the PAPR for a MU PPDU of the second U-SIG symbol by relocating the disregard bits sequence after BSS color field. It can be seen that the PAPR of both symbols is improved. The disregard bits sequence set to different values which can be seen from the FIG. 27 and FIG. 28.

It should be understood that the values changed for the first disregard bits sequence in FIG. 27 and FIG. 28 are only example for 20 MHz MU PPDU. But it is easy for skilled people to understand that the values used for the first disregard bits sequence for both MU PPDU and/or TB PPDU for different BW values could be any value presented in previous embodiments.

Figure 29:
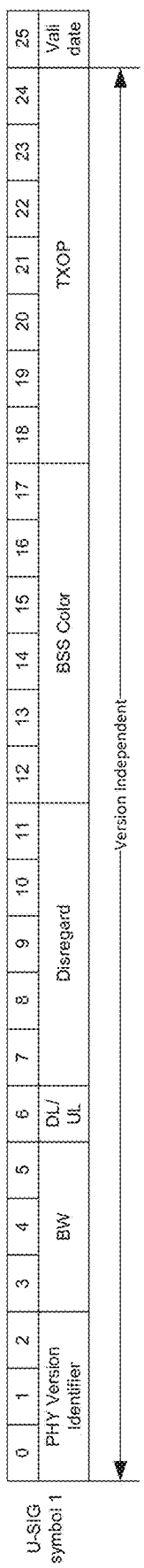
FIG. 29 shows the structure of the MU PPDU after relocating of the disregard bits sequence before BSS color field.

In another possible option, moving the disregard bits sequence of a MU PPDU before the BSS Color field. FIG. 29 shows the structure of the MU PPDU after relocating of the disregard bits sequence before BSS color field.

Figure 30:
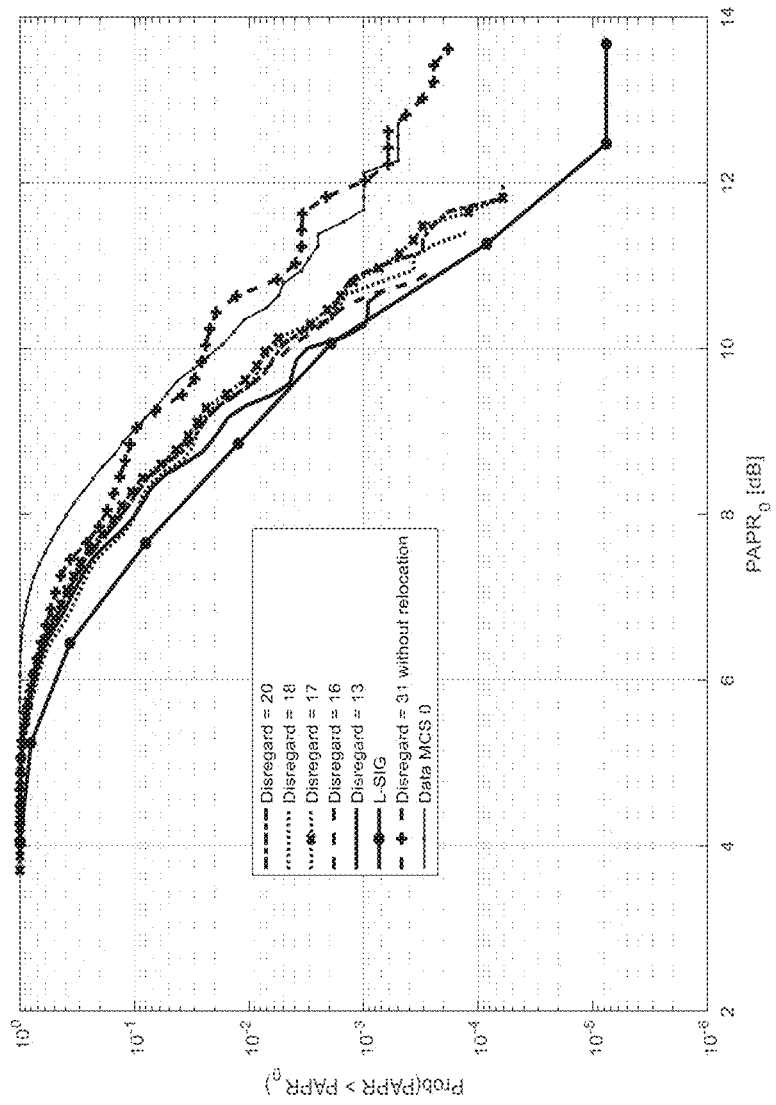
FIG. 30 shows the PAPR for a 20 MHz MU PPDU of the first U-SIG symbols by relocating the disregard bits sequence before BSS color field.
Figure 31:
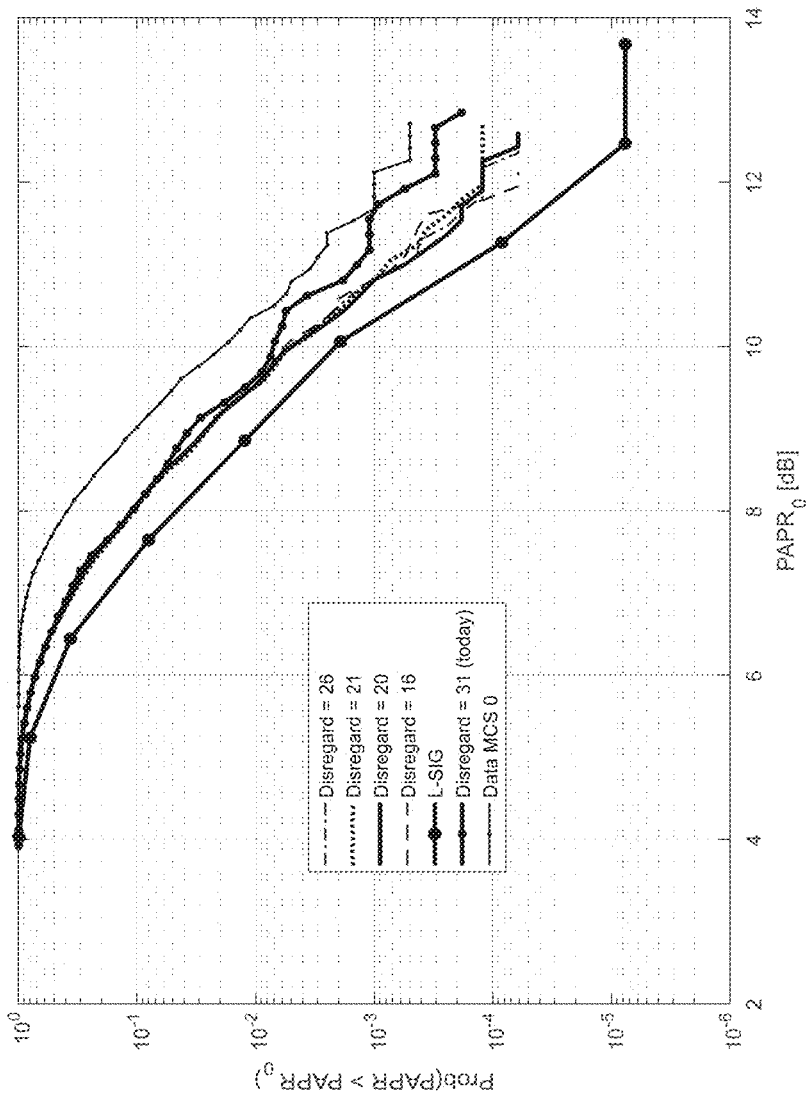
FIG. 31 shows the PAPR for a 20 MHz MU PPDU of the second U-SIG symbols by relocating the disregard bits sequence before BSS color field.

FIG. 30 shows the PAPR for a 20 MHz MU PPDU of the first U-SIG symbol by relocating the disregard bits sequence before BSS color field and FIG. 31 shows the PAPR for a 20 MHz MU PPDU of the second U-SIG symbol by relocating the disregard bits sequence before BSS color field. It can be seen that the PAPR results are even better than the previous relocation and a value of disregard bits sequence 16 in decimal yields good PAPR results for both symbols.

In one embodiment, operation on a first disregard bits sequence may include replacing a portion of the first disregard bits sequence with a cyclic redundancy check, CRC. The operation may replace the 5-bit disregard bits sequence in a first U-SIG symbol with a single bit set to '1' to indicate that it is followed by 4 CRC LSB bits (of a 8-bit CRC). Or alternatively, it can be set to '0' to indicate that it is followed by 4 CRC LSB bits. Or the LSB bit of the disregard bits sequence is used for indication that the 4 MSB bits of the disregard bits sequence are used for 4 CRC LSB bits. It should be understood that the remaining 4 bits except the indicating bit of the disregard bits sequence may also be used to carry the 4 CRC MSB bits. The present disclosure uses the 4 CRC LSB bits to be carried in the first U-SIG symbol's disregard bits sequence as example.

The 8-bit CRC is computed over the two U-SIG symbols and from it the 4 CRC LSB bits are extracted. The 8-bit CRC is computed over 38 bits including PHY Version, BW, DL/UL, BSS color, TXOP, '1', Validate, PPDU Type, Validate, Punctured Channel, Validate, EHT SIG MCS, #EHT Sig Symbols. The 8-bit CRC is then divided into the two U-SIG symbols.

Figure 32:
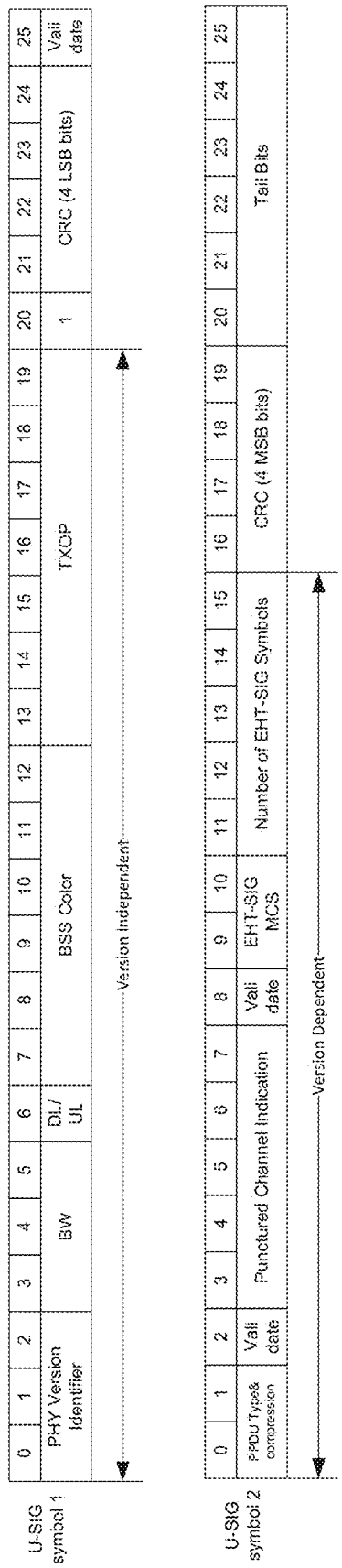
FIG. 32 shows the disregard bit sequence of the first U-SIG symbol is replaced by an indicator and 4 LSB CRC bits.

FIG. 32 shows the disregard bit sequence of the first U-SIG symbol is replaced by an indicator and 4 LSB CRC bits. It should be understood that the indicator bit may also be set as '0', and the 4 CRC LSB bits in the first U-SIG symbol may also be 4 CRC MSB bits while the 4 CRC MSB bits in the second U-SIG symbol may also be 4 CRC LSB bits.

Figure 33:
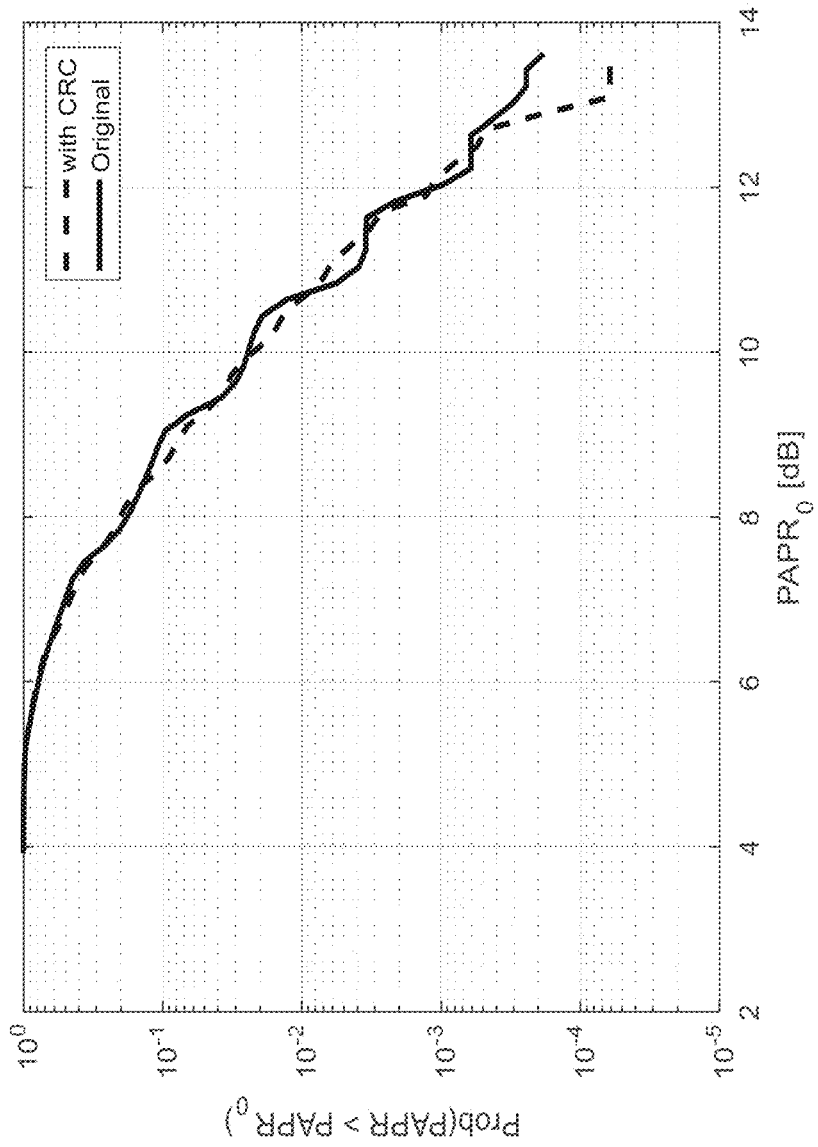
FIG. 33 shows the PAPR for a 20 MHz MU PPDU of the first U-SIG symbols by replacing the disregard bits sequence of the first U-SIG symbol with a 4 LSB CRC bits and 1 indicator bit.
Figure 34:
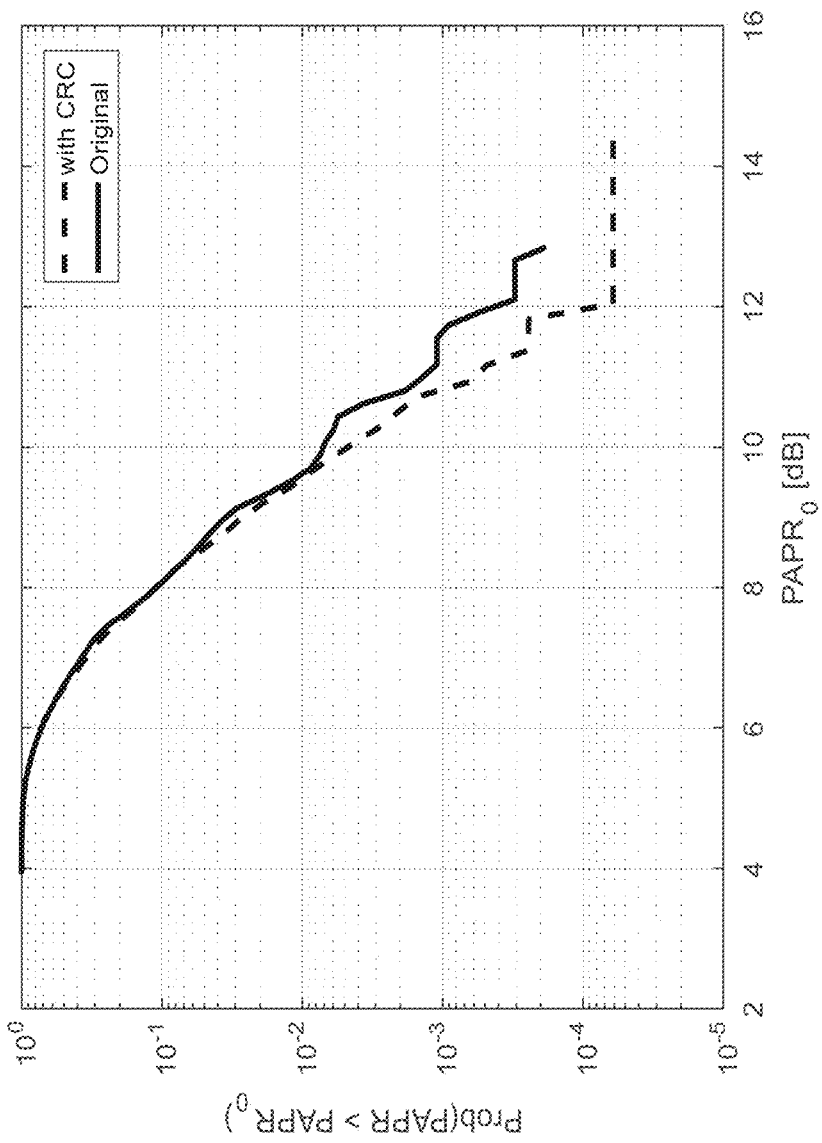
FIG. 34 shows the PAPR for a 20 MHz MU PPDU of the second U-SIG symbols by replacing the disregard bits sequence of the second U-SIG symbol with a 4 MSB CRC bits.

FIG. 33 shows the PAPR for a 20 MHz MU PPDU of the first U-SIG symbol by replacing the disregard bits sequence of the first U-SIG symbol with a 4 LSB CRC bits and 1 indicator bit. FIG. 34 shows the PAPR for a 20 MHz MU PPDU of the second U-SIG symbol by replacing the disregard bits sequence of the first U-SIG symbol with a 4 LSB CRC bits. Though the PAPR isn't significantly reduced for the first U-SIG symbol, it is much smoother than before replacing the disregard bits with a 4 LSB CRC bits and 1 indicator bit. The PAPR of the second U-SIG symbol is both reduced consistently and is smoother. By using this modification, the false alarm of U-SIG detection is furthermore reduced, since the transmitted CRC is longer.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Although the present disclosure describes the solution for reducing the PAPR from apparatus point of view, it is obvious for a skilled person to understand that the problems to be addressed in the present disclosure can also be implemented by a method and/or system. The method for reducing PAPR will not be elaborated in order to avoid redundancy.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. A communication device, comprising:
    a processor configured to operate on a first disregard bits sequence to obtain a second disregard bits sequence, wherein the first disregard bits sequence is with all bits set to '1'; and
    a transmitter, configured to transmit a physical layer protocol data unit (PPDU) to one or more receiving devices, wherein the PPDU comprises a universal signal (U-SIG) field and the second disregard bits sequence.

2. The communication device according to claim 1, wherein the U-SIG field comprises at least a first U-SIG symbol and a second U-SIG symbol.

3. The communication device according to claim 1, wherein operating on the first disregard bits sequence to obtain the second disregard bits sequence comprises:
    setting a value of the first disregard bits sequence to a sequence comprising at least one '0' bit; or
    changing a value of a validate bit immediately after the first disregard bits sequence to '0' and modifying the value of the first disregard bits sequence to a pre-set value; or
    changing a location of the first disregard bits sequence among U-SIG fields and changing the value of the first disregard bits; or
    replacing a portion of the first disregard bits sequence with a cyclic redundancy check (CRC).

4. The communication device according to claim 3, wherein setting the value of the first disregard bits sequence to the sequence comprising at least one '0' bit comprises:
    setting the first disregard bits sequence of a multi-user (MU) PPDU to one of the sequences in the set {'00101', '00110', '01001', '01111', '10011', '10101', '11000', '10110'}; or
    setting the first disregard bits sequence of a trigger-based (TB) PPDU for a first U-SIG symbol to one of the sequences in the set {'010010', '010011', '010100', '010101', '011100', '011101', '011110', '011111', '100101', '100010', '110100', '111000', '111001'}; or
    setting the first disregard bits sequence of a TB PPDU for a second U-SIG symbol to one of the sequences in the set {'01001', '01101', '01111', '11010', '11011', '11101', '11110', '11111'}; or
    setting a single global value of the first disregard bits sequence within the first U-SIG symbol for different bandwidth (BW) values for a TB PPDU, and the first disregard bits sequence is set as '011110' in binary; or
    setting a single global value of the first disregard bits in the second U-SIG symbol for different bandwidth values for a TB PPDU, and the first disregard bits sequence is set as '01001' or '11110' in binary.

5. The communication device according to claim 4,
wherein setting the value of the first disregard bits sequence of the MU PPDU to one of the sequences in the set {'00101', '00110', '01001', '01111', '10011', '10101', '11000', '10110'} comprises:
    the first disregard bits sequence is set to '00101' when the PPDU is transmitted over 20 MHz bandwidth; or
    the first disregard bits sequence is set to one of {'00101', '00110', '01001', '01111', '10011'} when the PPDU is transmitted over 40 MHz bandwidth; or
    the first disregard bits sequence is set to one of {'00101', '01111', '10011', '11000'} when the PPDU is transmitted over 80 MHz bandwidth; or
    the first disregard bits sequence is set to one of {'00101', '10101'} when the PPDU is transmitted over 160 MHz bandwidth; or the first disregard bits sequence is set to one of {'00101', '10110'} when the PPDU is transmitted over 320 MHz bandwidth; or the first disregard bits sequence is set to '00101' for any bandwidth;

and wherein setting the first disregard bits sequence of the TB PPDU for the first U-SIG symbol to one of the sequences in the set {'010010', '010011', '010101', '011100', '011101', '011110', '011111', '100101', '100010', '110100', '111000', '111001'} comprises:

the first disregard bits sequence of the TB PPDU for the first U-SIG symbol is set to one of the sequences in the set {'010010', '010011', '010101', '011100', '011101', '011110', '011111', '100101', '100010', '110100', '111000', '111001'}, the first disregard bits sequence of the TB PPDU for the second U-SIG symbol is copied from a trigger frame;

and wherein setting the first disregard bits sequence of the TB PPDU for the second U-SIG symbol to one of the sequences in the set {'01001', '01101', '01111', '11010', '11011', '11101', '11110', '11111'} comprises:

the first disregard bits sequence of the TB PPDU for the second U-SIG symbol is set to one of the sequences in the set {'01001', '01101', '01111', '11010', '11011', '11101', '11110', '11111'}, and the first disregard bits sequence of the TB PPDU for the first U-SIG symbol is set to '011110' in binary.

6. The communication device according to claim 3, wherein changing the value of the validate bit immediately after the first disregard bits sequence to '0' and modifying the value of the first disregard bits sequence to the pre-set value comprises:

setting the pre-set value to '01001' for 20 MHz bandwidth.

7. The communication device according to claim 3, wherein changing the location of the first disregard bits sequence among the U-SIG fields and changing the value of the first disregard bits comprises:

moving the first disregard bits sequence after a basic service set (BSS) color field and before a transmit opportunity (TXOP) field; or moving the first disregard bits sequence immediately before the BSS color field.

8. The communication device according to claim 3, wherein replacing the first disregard bits sequence with the CRC comprises:

taking one bit of the first disregard bits sequence as a CRC indicator, wherein the CRC indicator indicates four CRC bits are comprised in the first disregard bits sequence.

9. The communication device according to claim 8, wherein the four CRC bits are the least-significant bits (LSBs) of a 8-bit CRC, wherein the 8-bit CRC is computed over information bits transmitted over the first U-SIG symbol and the second U-SIG symbol.

10. The communication device according to claim 9, wherein the 8-bit CRC is divided into LSBs and most-significant bits (MSBs), wherein the MSBs are transmitted over the second U-SIG symbol.

11. The communication device according to claim 8, wherein the CRC indicator is set to '1' or '0'.

12. The communication device according to claim 1, wherein the PPDU comprises a multi-user (MU) PPDU or a trigger-based (TB) PPDU.

13. A method of reducing peak to average power ratio (PAPR) for transmitting a physical layer protocol data unit (PPDU), the method comprising:

operating on a first disregard bits sequence to obtain a second disregard bits sequence, wherein the first disregard bits sequence is with all bits set to '1'; and transmitting the PPDU, wherein the PPDU comprises a universal signal (U-SIG) field and the second disregard bits sequence.

14. The method according to claim 13, wherein the U-SIG field comprises at least a first U-SIG symbol and a second U-SIG symbol.

15. The method according to claim 13, wherein operating on the first disregard bits sequence to obtain the second disregard bits sequence comprises:

setting the value of the first disregard bits sequence to a sequence comprising at least one '0' bit; or changing the value of a validate bit immediately after the first disregard bits sequence to '0' and modifying the value of the first disregard bits sequence to a pre-set value; or changing a location of the first disregard bits sequence among U-SIG fields and changing the value of the first disregard bits; or replacing the first disregard bits sequence with a cyclic redundancy check (CRC).

16. A non-transitory computer-readable storage medium having stored thereon processor-executable instructions that, when executed by a processor of a communication device, cause the communication device to implement a method for reducing peak to average power ratio (PAPR) for transmitting a physical layer protocol data unit (PPDU), the method comprising:

operating on a first disregard bits sequence to obtain a second disregard bits sequence, wherein the first disregard bits sequence is with all bits set to '1'; and transmitting the PPDU, wherein the PPDU comprises the second disregard bits sequence.

* * * * *